(12) United States Patent
Takahama et al.

(10) Patent No.: US 6,771,416 B2
(45) Date of Patent: Aug. 3, 2004

(54) INVERTED MICROSCOPE

(75) Inventors: Yasuteru Takahama, Kodaira (JP); Shunichi Kubota, Hino (JP)

(73) Assignee: Olympus Optical Co., Ltd., Tokyo (JP)

(*) Notice: Subject to any disclaimer, the term of this patent is extended or adjusted under 35 U.S.C. 154(b) by 34 days.

(21) Appl. No.: 09/955,857

(22) Filed: Sep. 19, 2001

(65) Prior Publication Data

US 2002/0041438 A1 Apr. 11, 2002

(30) Foreign Application Priority Data

Sep. 20, 2000 (JP) .................................... 2000-285637
Apr. 18, 2001 (JP) .................................... 2001-119900

(51) Int. Cl.[7] .......................... G02B 21/36; G02B 23/00
(52) U.S. Cl. .................... 359/363; 359/368; 359/381
(58) Field of Search ................................ 359/363, 368, 359/369, 381; 348/79

(56) References Cited

U.S. PATENT DOCUMENTS

| | | | |
|---|---|---|---|
| 3,709,582 A | | 1/1973 | Walker et al. |
| 4,143,938 A | | 3/1979 | Feinbloom |
| 4,210,384 A | * | 7/1980 | Meyer et al. ............... 359/363 |
| 4,567,478 A | | 1/1986 | Schwab |
| 4,626,906 A | | 12/1986 | Ensor |
| 4,685,776 A | | 8/1987 | Inoue et al. |
| 4,770,520 A | * | 9/1988 | Hoogesteger ............... 359/513 |
| 5,235,459 A | | 8/1993 | Meyer et al. |
| 5,481,401 A | | 1/1996 | Kita et al. |
| 5,579,156 A | | 11/1996 | Faltermeier et al. |
| 5,777,783 A | * | 7/1998 | Endou et al. ............... 359/385 |

| | | | |
|---|---|---|---|
| 2002/0131165 A1 | | 9/2002 | Takahama et al. |

FOREIGN PATENT DOCUMENTS

| | | | |
|---|---|---|---|
| DE | 721942 A | | 6/1942 |
| DE | 2640974 | | 3/1978 |
| DE | 196 35 666 | C1 | 12/1997 |
| EP | 0770848 A | | 5/1997 |
| JP | 57-37848 | | 8/1982 |
| JP | 63-138314 | | 6/1988 |
| JP | 07-035986 A | | 2/1995 |
| JP | 08-043741 A | | 2/1996 |
| JP | 11-72715 A | | 3/1999 |
| JP | 11-194277 A | | 7/1999 |
| WO | WO 98/14816 A | | 4/1998 |

OTHER PUBLICATIONS

Afzal R.S. et al: "Optical Tweezers Using a Diode Laser", Review of Scientific Instruments, American Institute of Physics, New York, U.S., vol. 63, No. 4, Apr. 1, 1992, pp. 2157–2163.
Related U.S. patent application Ser. No. Ser. No. 10/102,098, filed Mar. 19, 2002; Inventors: Yasuteru Takahama et al; Title: Inverted Microscope.

* cited by examiner

Primary Examiner—Mark A. Robinson
(74) Attorney, Agent, or Firm—Frishauf, Holtz, Goodman & Chick, P.C..

(57) ABSTRACT

An inverted microscope comprises an image output port that forms an image of an observation sample to the external surface facing to an observer, at the front side of a microscope main body, below an observation tube to which eyepieces are attached, and photographing devices configured that one of at least two kinds of photographing devices is selectively attachable/detachable to the image output port.

3 Claims, 16 Drawing Sheets

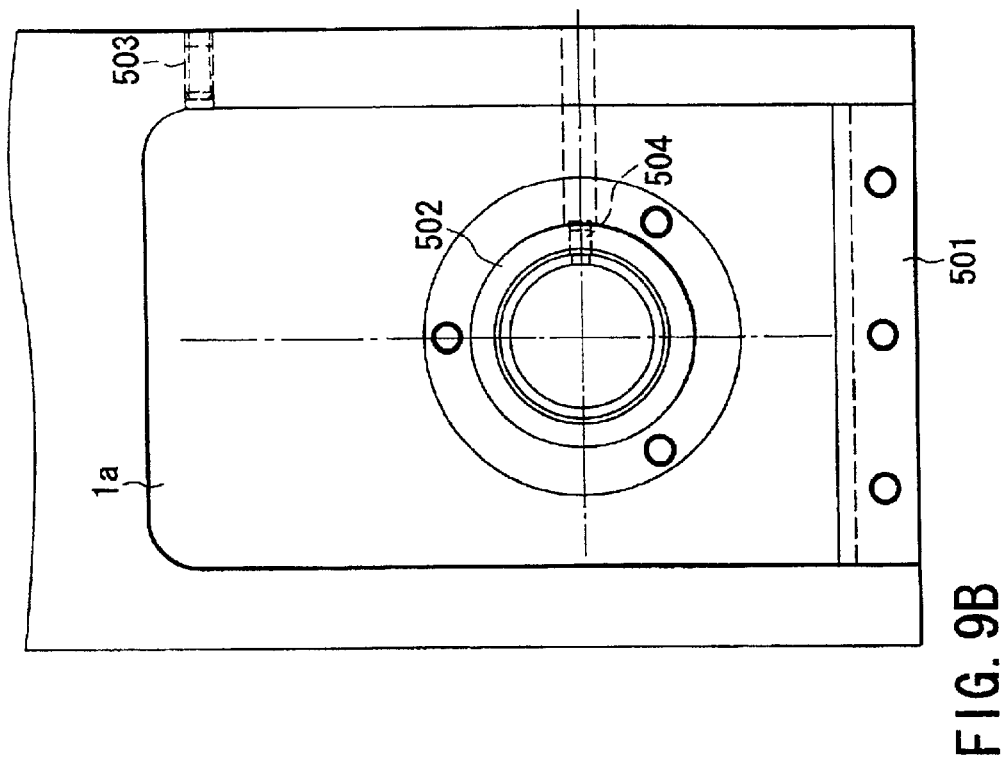
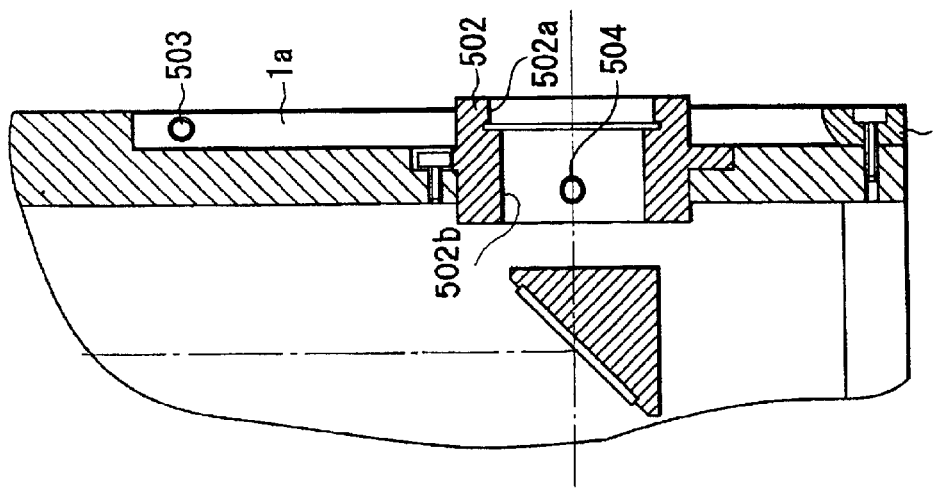
FIG. 9B
FIG. 9A

Imaging lens magnification list to obtain
same display magnification as eyepiece
(When eyepiece magnification is ten times)

| CCD size / LCD size | 1/4Inch Diagonal length 4mm | 1/3Inch Diagonal length 5.5mm | 1/2Inch Diagonal length 8.1mm | 2/3Inch Diagonal length 11mm | 1Inch Diagonal length 16.2mm |
|---|---|---|---|---|---|
| 3.5Type Diagonal length 89mm | 0.45 | 0.52 | 0.91 | 1.24 | 1.82 |
| 6Type Diagonal length 152mm | 0.26 | 0.36 | 0.53 | 0.72 | 1.06 |
| 10.4Type Diagonal length 264mm | 0.15 | 0.21 | 0.31 | 0.42 | 0.61 |

FIG. 13

Imaging lens magnification list to obtain
same display magnification as eyepiece

| CCD size / Aperture FN | 1/4Inch Diagonal length 4mm | 1/3Inch Diagonal length 5.5mm | 1/2Inch Diagonal length 8.1mm | 2/3Inch Diagonal length 11mm | 1Inch Diagonal length 16.2mm |
|---|---|---|---|---|---|
| 22 | 0.18 | 0.25 | 0.37 | 0.5 | 0.73 |
| 26.5 | 0.15 | 0.21 | 0.31 | 0.42 | 0.61 |

FIG. 14

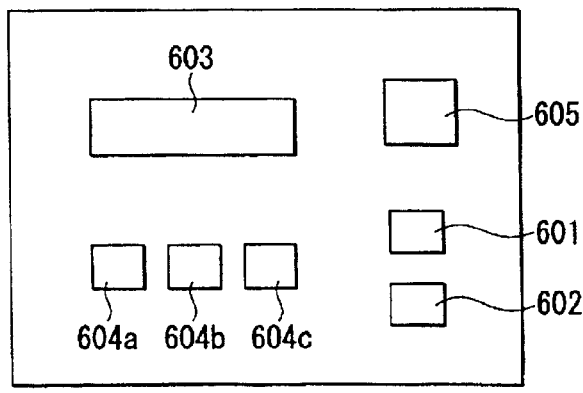

FIG. 15

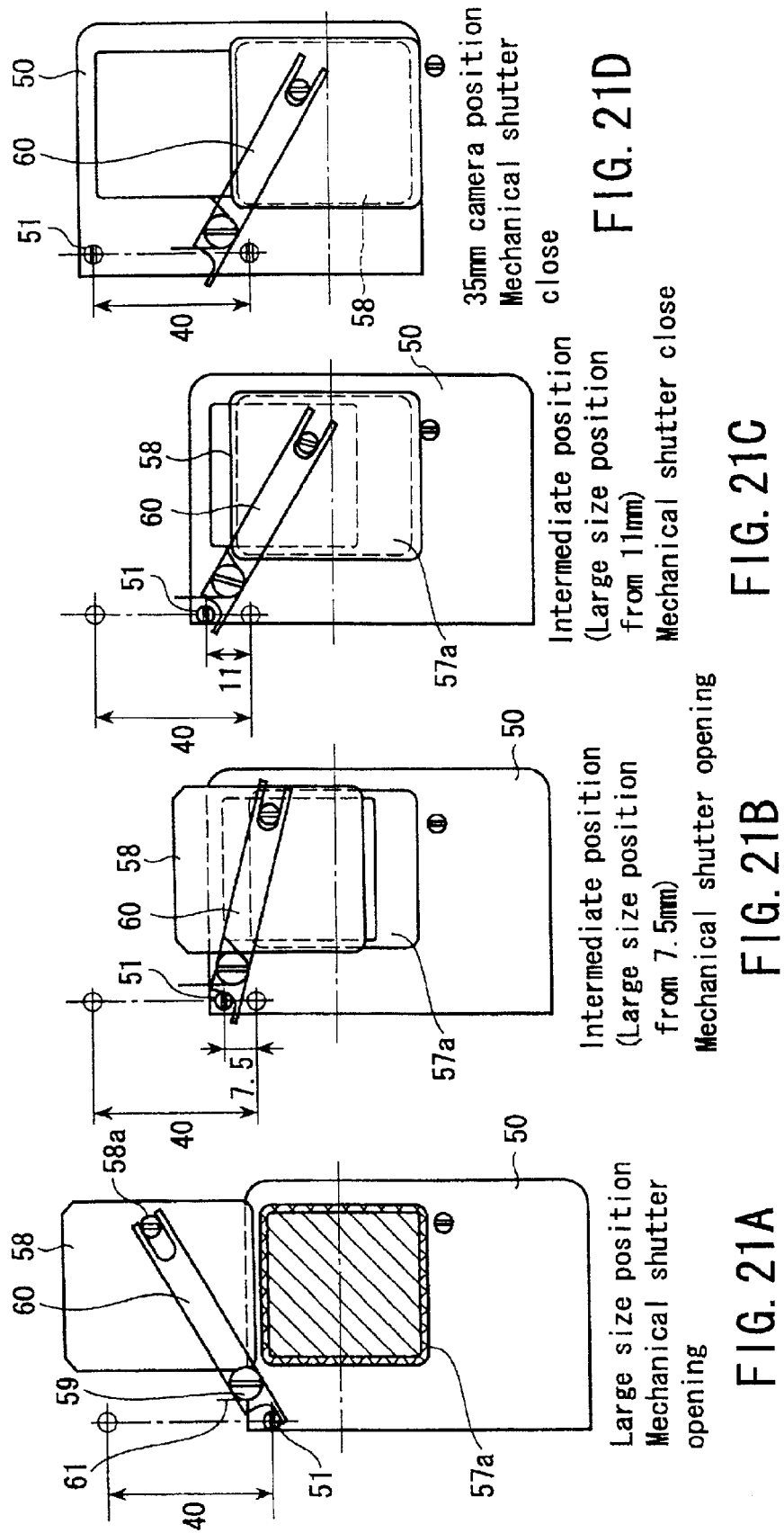

INVERTED MICROSCOPE

CROSS-REFERENCE TO RELATED APPLICATIONS

This application is based upon and claims the benefit of priority from the prior Japanese Patent Applications No. 2000-285637, filed Sep. 20, 2000; and No. 2001-119900, filed Apr. 18, 2001, the entire contents of both of which are incorporated herein by reference.

BACKGROUND OF THE INVENTION

1. Field of the Invention

The present invention relates to an inverted microscope for magnifying and observing a sample placed on a stage by objective lenses arranged directly below the stage.

2. Description of the Related Art

Microscope photographing devices are widely employed for recording applications in research activities of respective fields handling living cells in medical science and physiology, research and testing activities in industrial fields to observe structures of various metallurgical materials, and to detect faults and contents thereof, and the like. Still at present when electronic imaging technologies in digital cameras and the like are spreading, microscope photographing devices, wherein a large film size camera, a 35 mm film camera, or both of them are arranged at the same time, and exposure photographing is carried out onto at least either a large size film or a 35 mm film, are frequently employed in inspection departments and the like of metallurgical materials and the like where photographing is the objective itself.

As one of microscopes using these photographing devices, for examples, in Japanese Patent Application KOKAI Publication No. 63-138314 and Japanese Patent Application KOKOKU Publication No. 57-37848, disclosed are inverted microscopes integrating photographing devices, therein arranged is a configuration that enables exposure photographing onto at least either a large size film or a 35 mm film.

In such inverted microscopes integrating photographing devices (not shown in the above publications), an electromagnetic shutter for releasing is arranged in the front of a position where an image forming light flux is polarized onto a large size film and a 35 mm film, and by opening and closing the above electromagnetic shutter, it is possible to carry out exposure onto the large size film and the 35 mm film.

In recent years, along with the progress of electronic imaging technologies, high precision digital images may be handled easily, and digital cameras are assembled into many optical microscopes. In the case when such a digital camera is assembled into an inverted microscope, the digital camera is arranged through a TV camera photographing lens onto a top port of a trinocular observation tube, or the digital camera is arranged onto a side port through the same TV camera photographing lens.

On the other hand, apart from the applications for recording images by use of several type of a camera, there are applications for observing magnified images of samples by placing an obscure glass (so-called a screen device) at an attached position of a large size film camera.

In this case, an observer removes a large size film camera first, and attaches a screen device (not illustrated) provided with an obscure glass in the place.

In the practical observation of a sample image by the screen device, since the attachment position is originally the attachment position of a large size film camera, by setting the shutter in manual operation mode and setting it always opened, a sample image may be displayed on the screen. So as to display clearer images, some devices are equipped with also a hood for blocking light from the external at the external circumference of the screen.

Recently, there is a demand in markets for replacing the observation work by looking into eyepieces with the observation work by use of monitor devices such as LCD or the like.

The observation work through eyepieces, wherein an observer must keep a same rigid posture for long hours, will cause fatigue on the observer. Since it is impossible for plural observers to carry observation, there are cases where a device to enable eyepiece observation by plural observers, what is called a discussion device, is additionally installed, or a special TV camera and a monitor are arranged solely for observation by plural observers.

However, in photographing magnified images of an observation sample by a TV camera or a digital camera, when photographing is carried out at the side port, it is impossible to photograph a scale and the like to be inserted into the position of a primary image.

Accordingly, in order to avoid this problem, there is a method of arranging a TV camera or a digital camera onto a top port of a trinocular observation tube through a TV camera photographing lens. However, in this case, a TV camera or a digital camera is positioned in the front of an observer, the observer must displace his posture laterally when to confirm a sample directly by visual inspection, which causes fatigue on the observer and is not preferable accordingly.

Further, when photographing is not carried out by a large size film camera or a 35 mm film camera etc., to those observers, since unnecessary functions are provided to a microscope main body, the large size film camera or the 35 mm film camera is not only useless, but also leads to increased costs, which has been a problem in the prior art.

When to carry out observation by use of an external monitor or a monitor to be connected with a personal computer, there are many cases where the magnification of an observation image to be displayed cannot be grasped. Especially in observation and records of metallurgical structures, in many cases, observations is conducted by photographing of a large size film or a 35 mm film or screen, so the point that the magnification of an observed image cannot be grasped directly at field has been a problem in many cases.

In a microscope in which a photographing device is incorporated as described in Japanese Patent Application KOKAI Publication No. 63-138314, since an electromagnetic shutter is not arranged just before a large size film surface of a large size film camera portion, or just before a 35 mm film surface of a 35 mm film camera, and the space of the large size film camera portion and the space of the 35 mm film camera are connected with the space of a photographing device portion, it is required to take countermeasures against stray light so that unnecessary stray light in the inside of photographing device should not reach to each film surface.

A large size film camera normally has a light blocking plate that is manually operated just before a large size film surface, and before a microscope operator photographing to a large size film, this light blocking plate is retreated manually from light path, and after completion of photographing, the light blocking plate is placed back to its original position so that the film should not be exposed to light once again.

However, a 35 mm film camera does not have this light blocking plate, and when a 35 mm film camera is attached to a photographing device, a shutter in the 35 mm film camera is opened automatically, or a 35 mm film camera initially is not equipped with a shutter, therefore, it is necessary to conduct countermeasures against light leakage especially to a 35 mm film.

On the other hand, the above Japanese Patent Application KOKAI Publication No. 63-138314 (or Japanese Patent Application KOKOKU Publication No. 57-37848) does not describe the contents on the above technology, therefore its details are not clear.

In practical applications, in the microscope having incorporated a photographing device therein as mentioned above, a light path switching mechanism is devised so as to lead an image forming light flux to a large size film surface and a 35 mm film surface, and a switching stroke of a light path switching block is made large, or a 35 mm film camera and the light path switching mechanism are separately blocked with a cylindrical light blocking member so that image forming light flux should not be guided to both the large size film surface and the 35 mm film surface.

Further, it is experimentally verified whether these countermeasures can actually and completely prevent light from leaking or not, and in the case where blocking light is incomplete, various parts to block light are employed in the inside space of a photographing device, which requires a large amount of costs and time in most cases, which has been a problem seen in the prior art.

Further, the above countermeasures against light leakage are effective only when both a large size film camera and a 35 mm film camera are attached to a photographing device in correct manners, therefore, for example, if a large size film camera is removed from a photographing device, there is a fear that a 35 mm film may be exposed to light coming in from the outside, as a consequence, they are not complete countermeasures, which has been another problem with the prior art known well by those skilled in the art.

On the other hand, the above light path switching mechanism for guiding the above image forming light flux to the large size film surface and the 35 mm film surface is normally operated manually, therefore, if its light path switching block is not at a right switching position but at a central position, part of image forming light flux will not be projected correctly onto a film surface, which is called phenomenon of eclipse, and this phenomenon has been still another nonconformity with the prior art.

BRIEF SUMMARY OF THE INVENTION

Accordingly, an object of the present invention is to provide an inverted microscope that enables efficient combinations of effective image recording devices, and enables to carry out monitor observation and image recording without eyepieces.

Another object of the present invention is to provide an inverted microscope that enables to attach a large size film camera and a camera such as a 35 mm film camera thereto at the same time, and to precisely prevent light leakage to the other camera in the status where one camera is not attached thereto, and to prevent a mistake in photographing owing to light path switching operation.

The inverted microscope according to the present invention is characterized by comprising: an image output port that forms an image of an observation sample to the external surface facing to an observer, at the front side of a microscope main body, below an observation tube to which eyepieces are attached, wherein photographing devices configured that one of at least two kinds of photographing devices is selectively attachable/detachable to the image output port. Further, the inverted microscope according to the present invention is characterized in that the at least two kinds of photographing devices include: a photographing device that exposes and forms the image of the observation sample onto a film surface thereof; a TV camera that photographs the image of the observation sample by a photographing element thereof and outputs image data thereof; and a digital camera device that photographs the image of the observation sample and can record the image data as a still image into a recording medium.

The inverted microscope according to the present invention is characterized comprising: an image forming optical system including objective lenses arranged below an observation sample placed on a stage of a microscope main body; an optical element which forms an image of the observation sample at the position where an image forming light flux obtained by the image forming optical system is polarized to an observer side from the optical axis of the objective lens; photographing means for photographing an image of the observation sample; an image recording section configured to record image signals photographed by the photographing means; and display means attached to the surface facing to the observer at the front of the microscope main body, for displaying images photographed by the photographing means.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate embodiments of the invention, and together with the general description given above and the detailed description of the embodiments given below, serve to explain the principles of the invention.

FIGS. 9A and 9B are schematic diagrams showing a configuration of an inverted microscope as a fourth embodiment according to the present invention;

FIG. 13 is a table showing magnifications of a photographing lens for observation with the same magnification as that of eyepieces in a display device such as LCD or the like (magnification of 10);

FIG. 14 is a diagram for explaining a fifth embodiment of the present invention;

FIG. 15 is a diagram for explaining a sixth embodiment of the present invention;

FIGS. 21A through 21D are diagrams showing actions of a mechanical shutter in one embodiment of a microscope photographing device according to the present invention;

DETAILED DESCRIPTION OF THE INVENTION

The invention is illustrated in more details by reference to the following referential examples and preferred embodiments.

Figure 1:
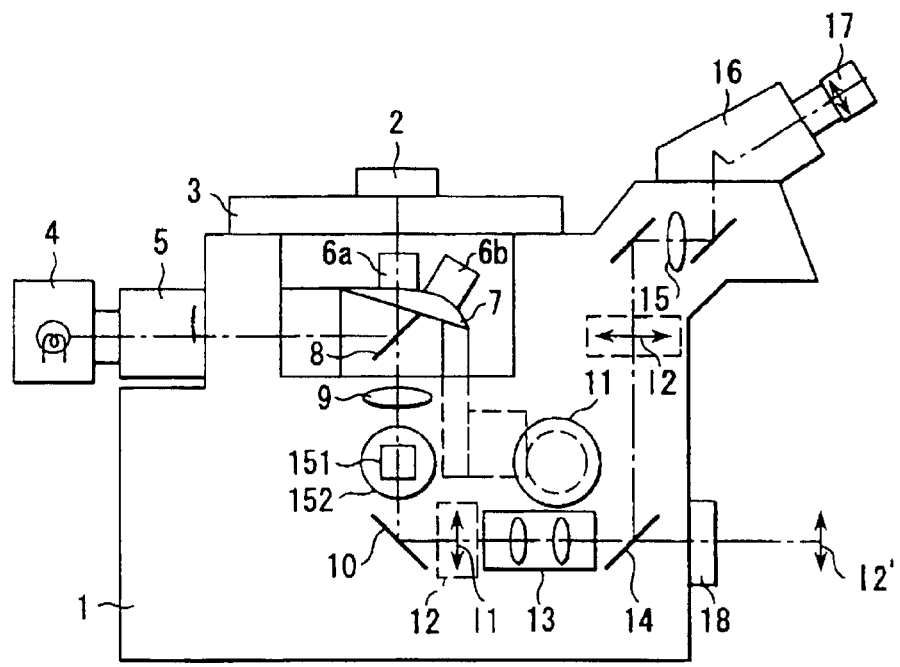
FIG. 1 is a figure showing an outline configuration of a first embodiment according to the present invention.
Figure 2A:
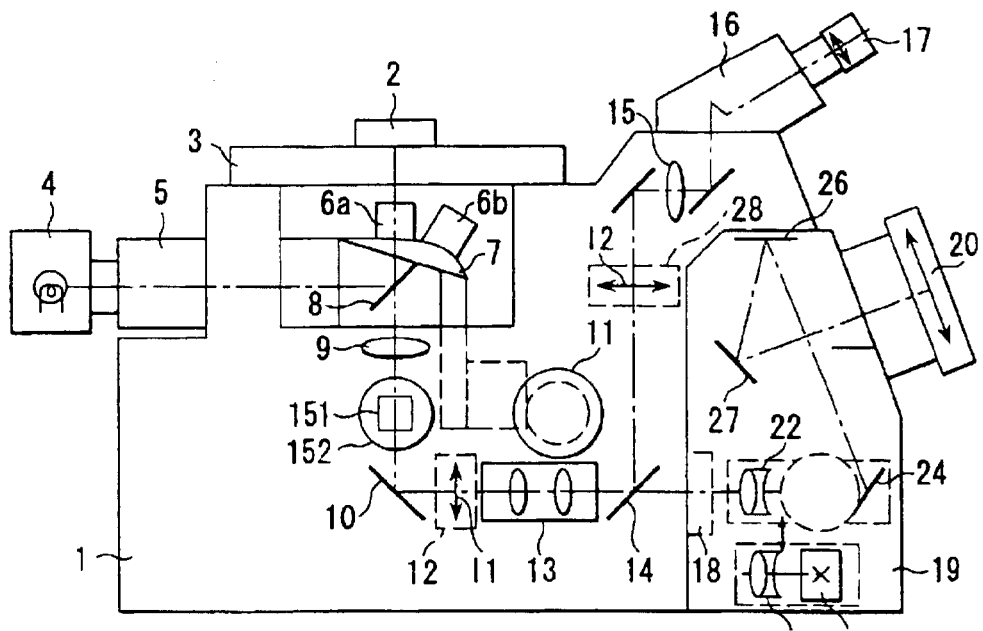
FIGS. 2A and 2B are figures showing an outline configuration of the first embodiment according to the present invention, wherein a photographing device is incorporated.
Figure 2B:
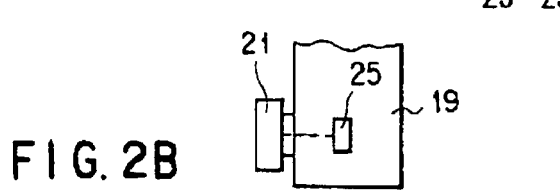

FIG. 1 is a figure showing an outline configuration of an inverted microscope to which a first embodiment according to the present invention is applied. FIG. 2A and FIG. 2B are structural diagrams in case of a photographing device that enables to attach a large size film camera and a 35 mm film camera to the inverted microscope of FIG. 1 is incorporated.

Figure 3:
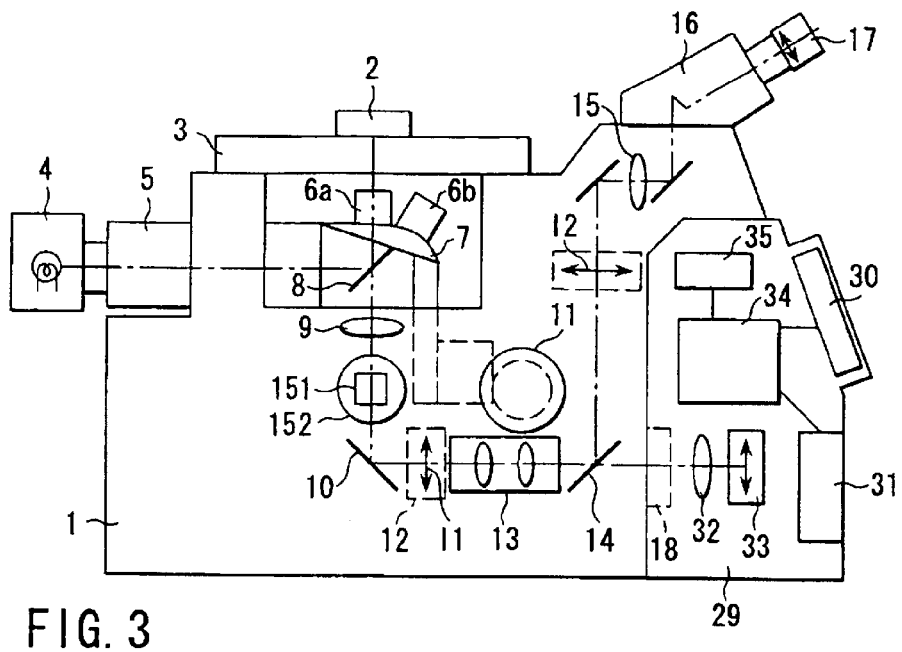
FIG. 3 is a figure showing an outline configuration of the first embodiment according to the present invention, wherein a digital camera device is incorporated.
Figure 4:
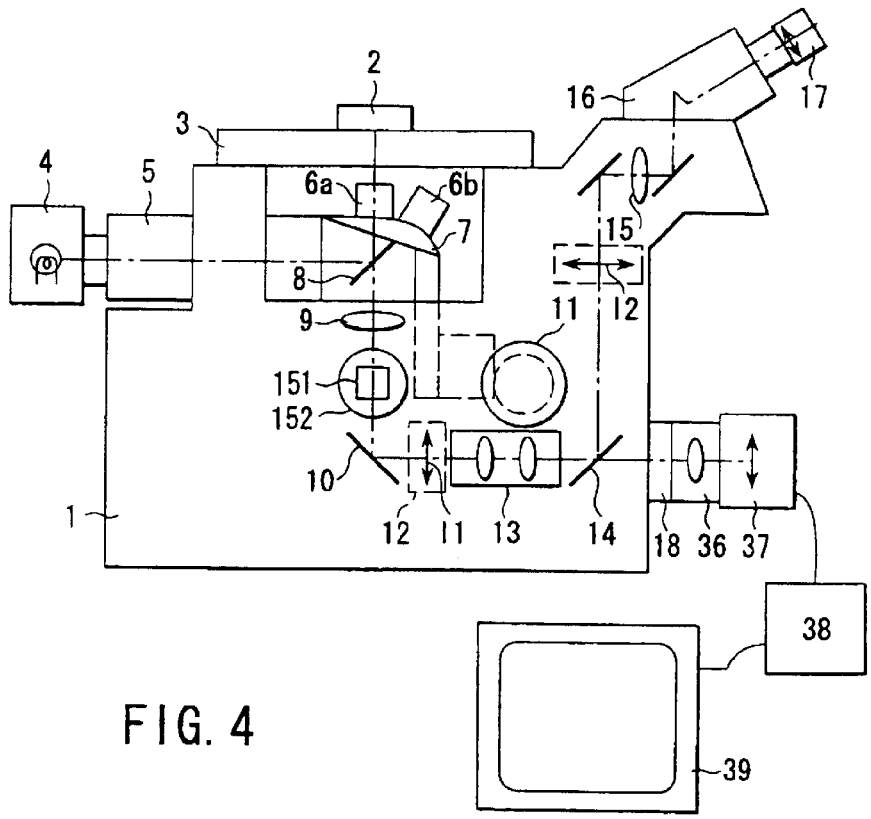
FIG. 4 is a figure showing an outline configuration of the first embodiment according to the present invention, wherein a TV camera is incorporated.

FIG. 3 is a structural diagram showing a combination of the inverted microscope of FIG. 1 and a digital camera device that enables moving image observation by a display device such as LCD or the like built therein. FIG. 4 is a figure showing a combination of the inverted microscope of FIG. 1 and a TV camera.

In FIG. 1, at the top of a microscope main body (hereafter referred to as scope body) 1, arranged is a stage 3. On this stage 3, placed is an observation sample 2. Light flux from a light source device 4 by halogen lamp and the like is guided to the scope body 1 via a light projection tube 5, and then reflected by a half mirror 8, and then radiated via an objective lens 6 onto the observation sample 2. In this case, plural objective lenses 6 are held by a revolver 7 and are selectively placed in light path. The light reflected from the observation sample 2 penetrates the half mirror 8 through the objective lens 6, and an magnified image of the observation sample 2 is formed by a tube lens 9 together with the objective lens 6, and then polarized in the horizontal direction by a reflection mirror 10, and thereby a primary image I1 of the observation sample 2 is formed.

By the way, a scale and the like 12 may be inserted into the position of this primary image I1 for measuring partial size of an observation sample.

Further, the above primary image I1 goes through a zoom optical system 13, and then is selectively guided into 2 light fluxes, i.e., a reflected light toward the vertically upside and a permeable light to the forward by a mirror 14 that may be inserted into and removed from the light path. The reflection light that is reflected to the vertically upside forms a secondary image I2, and further is relayed by a relay optical system 15, and then goes into an eyepiece 17 arranged at the observation tube 16, and reaches at the eye of an observer, then is observed by observer. On the other hand, the permeable light to the forward direction forms a secondary image I2' at the position protruded by a specified distance from a front port 18 arranged at the front bottom of the scope body 1. To this front port 18, an image recording device to be described later herein may be provided in an attachable/detachable manner.

By the way, in FIG. 1, also illustrated are a split prism 151 that branches the light flux in the horizontal direction (paper sheet vertical direction) just below a tube lens 9, a side port 152 that photographs the light flux branched by the split prism 151 by use of a TV camera and the like, and a focusing handle 11 that drives the revolver 7 holding plural objective lenses 6 upward and downward, and thereby changes the relative distance between the observation sample 2 on the stage 3 and the objective lens 6, then thereby sets focus on the observation sample 2.

Next, a configuration in case where a photographing device to which a large size film camera and a 35 mm film camera may be attached is incorporated into the inverted microscope described in FIG. 1 is explained in reference to FIG. 2A and FIG. 2B. In FIG. 2A and FIG. 2B, identical codes are placed to the same parts as in FIG. 1, and their detailed explanations are omitted herein.

In this case, the scope body 1, the stage 3 arranged on the scope body 1, the light source device 4, the light projection tube 5, the objective lens 6, the observation tube 16, eyepieces 17 and the like are identical with those in FIG. 1, therefore, their detailed explanations are omitted herein.

In a configuration shown in FIG. 2A and FIG. 2B, a photographing device 19 having a shape to cover the entire front of the scope body 1 is arranged at the front port 18. A large size film camera 20 that enables photographing in large size films such as 4 inches×5 inches, 4¼ inches×3¼ inches, and the like is attached to this front side of the photographing device 19, while a 35 mm film camera 21 (not illustrated) that enables photographing in 35 mm films is attached to the side of the photographing device 19.

Inside of the photographing device 19, two kinds of photographing lenses 22 and 23 that may be inserted into and removed from the light path from the front port 18 are arranged. The photographing lens 22 is one for the large size film camera 20, while the photographing lens 23 is one for the 35 mm film camera 21. The large size film camera photographing lens 22 and a reflection mirror 24 are configured as a body, while the 35 mm film camera photographing lens 23 and a reflection mirror 25 are configured as a body. The photographing lens 22 and the reflection mirror 24, or the photographing lens 23 and the reflection mirror 25 are selectively arranged in the light path, an image of an observation sample is formed selectively on the respective film surfaces of the large size film camera 20 and the 35 mm film camera 21 respectively arranged on the front surface and the side surface of the photographing device 19. The light flux reflected by the reflection mirror 24 through the photographing lens 22 is further reflected by two reflection mirrors 26 and 27, and then reaches at the large size film camera 20. Accordingly, in this photographing device 19, the light flux going toward the large size film camera 20 is reflected 3 times in total and forms an image. The light flux reflected by the reflection mirror 25 through the photographing lens 23 reaches at the 35 mm film camera 21 as it is. Accordingly, in this photographing device 19, the light flux going toward the 35 mm film camera 21 is reflected only once and forms an image.

By the way, a photo frame 28 showing an area photographed by the large size film camera 20 and 35 mm film camera 21 may be inserted into the position of the above secondary image I2.

Next, actions in the actual photographing operation in an inverted microscope with such a photographing device 19 built therein will be explained.

First, the mirror 14 in the scope body 1 is inserted into the light path to prepare a status wherein a sample can be observed by eyepieces. Thereafter, the revolver 7 is turned and an objective lens 6a of low magnification is selected, then the focusing handle 11 is turned and focus is set onto the observation sample 2. Then, the revolver 7 is turned to switch to an objective lens 6b of high magnification, and if the focus is blurred, then the focusing handle 11 is turned a bit to set the focus precisely. When to change observation positions, the XY handle (not shown in the figure) of the stage 3 is operated, and the position of the observation sample 2 is moved, and the desired observation position is moved within the sight of the objective lens 6b.

Next, the photo frame 28 for showing the area photographed by the there large size film camera 20 and the 35 mm film camera 21 is inserted into the position of the secondary image I2, and the area to be taken in by the there large size film camera 20 or the 35 mm film camera 21 is checked. If the area to be taken in is good, then the mirror 14 in the scope body 1 is retreated from the light path, and passage light is supplied to the photographing device 19, and then exposure operation of the photographing device 19 is carried out, and photographing is complete.

Next, in reference to FIG. 3, explained is a configuration where a digital camera that enables moving image observation by use of its built-in display device such as LCD or the like is assembled into the inverted microscope described in reference to FIG. 1. In FIG. 3, identical codes are placed to identical components in FIG. 1, and their detailed explanations are omitted herein.

In this case, the scope body 1, the stage 3 arranged on the scope body 1, the light source device 4, the light projection tube 5, the objective lens 6, the observation tube 16, eyepieces 17 and the like are identical with those in FIG. 1, therefore, their detailed explanations are omitted herein.

In a configuration shown in FIG. 3, a digital camera device 29 having a shape to cover the entire front of the scope body 1 is arranged at the front port 18. At the frontal top of this digital camera device 29, embedded is a display device 30 such as LCD or the like as display means, while at the frontal bottom, arranged is an operating portion 31 that sends various instructions to the digital camera device 29 itself.

Inside of the digital camera device 29, there are arranged a photographing lens 32 for contracting the light flux incoming from the front port 18 of the scope body 1 and forming an image, and a CCD 33 for outputting the light that has formed an image by the photographing lens 32 as visual signal. An image recording portion 35 to which an internal memory or an MO (magnetic optical disk) and smart media and the like as a recording medium are attachable, the above display device 30 such as LCD or the like, and the operating portion 31 are connected to a signal processing portion 34 that is connected with the CCD 33 and processes output from the CCD 33, respectively.

Next, actions in the actual observation and recording operation in an inverted microscope with such a digital camera device 29 built therein will be explained.

First, the mirror 14 in the scope body 1 is retreated from the light path, and light is supplied to the digital camera device 29. By manipulating the operating portion 31, preview mode (moving image observation mode) is set, and an image is displayed onto the display device 30 such as an LCD or so. Thereafter, the revolver 7 is turned and an objective lens 6a of low magnification is selected, then the focusing handle 11 is turned and focus is set onto the image displayed on the display device 30 such as an LCD or so. Then, the revolver 7 is turned to switch to an objective lens 6b of high magnification, and if the focus is blurred, then the focusing handle 11 is turned a bit to set the focus precisely. When to change observation positions, the XY handle (not shown in the figure) of the stage 3 is operated, and the position of the observation sample 2 is moved in an XY direction, and the desired observation position is moved within the sight of the objective lens 6b.

Next, when recording images into a recording medium such as an MO or smart media and the like, by manipulation at the operating portion 31, the mode is switched from preview mode into recording mode. Thereby, and by photographing operation at the operating portion 31, an instruction for image recording is output to the signal processing portion 34, which in turn records the image data accumulated by the CCD 33 to the image recording portion 35, and actions are complete. By the way, at completion of the image recording actions, the mode is changed into preview mode automatically, and the current image is displayed on the display device 30 such as LCD or the like in real time manner.

Next, in reference to FIG. 4, a configuration in the case where the inverted microscope mentioned in reference to FIG. 1 is combined with a TV camera and a monitor will be explained. In FIG. 4, identical codes are placed to identical components in FIG. 1, and their detailed explanations are omitted herein.

In this case, the scope body 1, the stage 3 arranged on the scope body 1, the light source device 4, the light projection tube 5, the objective lens 6, the observation tube 16, eyepieces 17 and the like are identical with those in FIG. 1, therefore, their detailed explanations are omitted herein.

In a configuration shown in FIG. 4, a TV adapter 36 having a photographing lens therein is arranged at the front port 18. A TV camera 37 having a photographing element such as a CCD or the like is attached to this TV adapter 36. An output signal from the TV camera 37 is processed by a camera control unit 38, and output to an external monitor 39. The images to be observed by this external monitor 39 may be recorded by use of a publicly known video printer (not illustrated herein) and the like, however, explanations on the actions thereof are omitted here.

As mentioned heretofore, in the inverted microscope as the first embodiment according to the present invention, an image recording device is not installed in the microscope main body, while a secondary image 12 of an observation sample is formed at the position protruded by a specified distance from the front port 18. To this front port 18, 3 image recording devices, namely, a photographing device 19 to which a large size film camera and a 35 mm film camera may be loaded, a digital camera device 29 that enables moving image observation by use of a built-in display device such as an LCD or so, and a TV camera 37, may be selectively attached or detached from. Therefore, it is possible to configure a system according to observer's desired applications. Further, a special photographing lens is arranged in each image recording device, it is possible to realize the optimized magnification for each medium of a large size film, a 35 mm film, CCD, and the like. The optimized magnification herein is defined as, for example, a magnification that realizes a wide photographing (image forming) area almost equal to the observation area by eyepieces.

The secondary image of a sample is set so as to be input into an image recording device, and a zoom optical system is arranged between the primary image of observation sample and the secondary image thereof. As a consequence, an advantage has been made that it is possible to take a scale for measuring partial size of an observation sample into all the image recording devices that may be attached onto the front port. Further another advantage has been made that it is possible to project magnification converted images by a zoom optical system.

The light from the observation sample is reflected once by the reflection mirror 10 in the scope body 1, and then reflected three times to a large size film camera by the photographing device 19, while it is reflected once to a 35 mm film camera, and an image that is reflected even number times in total is photographed. Accordingly, it is possible to photograph a front image. The number of reflections toward the eyepieces 17 is set as minimum as possible, it is possible to attain a preferable observation without deterioration in brightness of an observation image and image quality. Namely, it is possible to restrict the light amount loss by reflection of an image forming light flux in the microscope main body (scope body) and the deterioration of image quality to the minimum, and to make an image that is formed on the film surface of a large size film camera and a 35 mm film camera a front image (an image in the same direction as that where the sample surface is observed), as a consequence, it is possible to precisely record magnified images of structures of metal or so.

When to add another unit of TV camera or digital camera after attaching these image recording devices to the front port 18, it is possible to attach such an additional unit to the side port 152 via a TV adapter 36, which increased the expandability of a system.

By the way, the display device such as LCD or the like to be assembled in a digital camera device may be a plasma display, or a CRT, and any TV camera that has other element such as a CMD element or the like than a CDD may be well employed.

Figure 5:
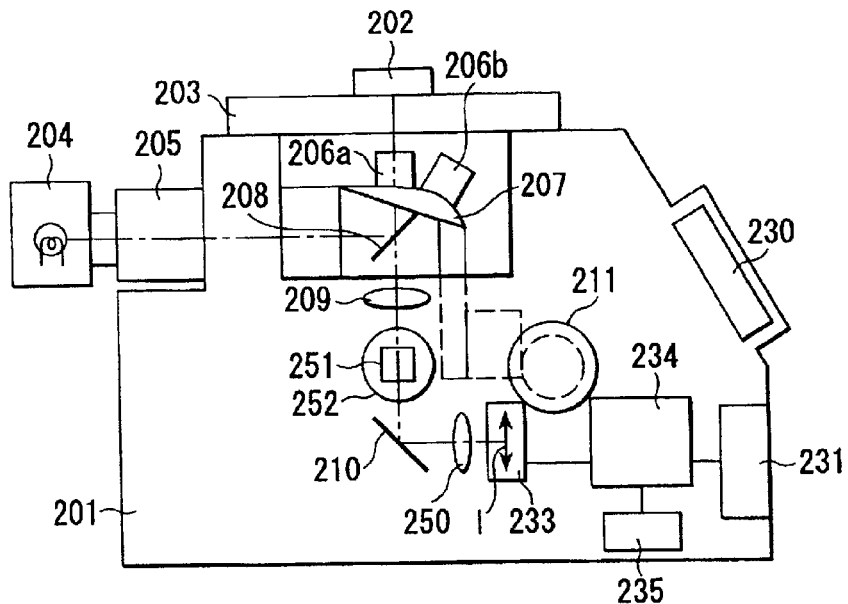
FIG. 5 is a figure showing an outline configuration of a second embodiment according to the present invention.

FIG. 5 is a figure showing an outline configuration of an inverted microscope as the second embodiment according to the present invention.

In FIG. 5, a stage 203 is arranged at the top of a microscope main body (hereafter referred to as scope body) 201. An observation sample 202 is placed on this stage 203. Light flux from a light source device 204 by halogen lamp and the like is guided to the scope body 201 via a light projection tube 205. The light flux is reflected by a half mirror 208, and then radiated via an objective lens 206 onto an observation sample 202. In this case, plural objective lenses 206 are held by a revolver 207 and are selectively placed in light path. The light reflected from the observation sample 202 penetrates the half mirror 208, and a magnified image of the observation sample 202 is formed by a tube lens 209 together with the objective lens 206. Further, the reflected light is then polarized in the horizontal direction by a reflection mirror 210, and thereby an image of the observation sample 202 by the tube lens 209 is shrunken and photographed by the photographing lens 250 and an image I of the observation sample 202 is formed.

In this case, a display device 230 such as LCD or the like as display means is embedded at the front surface of the scope body 201. While an operating portion 231 that sends various instructions is arranged at the frontal bottom. At the position of the image I of the observation sample, built in is a CCD 223 for outputting the light image formed by the photographing lens 250 as visual signal. To the CCD 233, a signal processing portion 234 that processes the output from the CCD 233 is connected. To this signal processing portion 234, an image recording portion 235 to which an internal memory or an MO (magnetic optical disk) and smart media and the like as a recording medium are attachable, the above display device 230 of an LCD or so, and the operating portion 231 are connected, respectively.

Herein, in FIG. 5, there also illustrated a split prism 251 that branches the light flux in the horizontal direction (paper sheet vertical direction) just below a tube lens 209, a side port 252 that photographs the light flux branched by the split prism 251 by use of a TV camera and the like, and a focusing handle 211 that drives the revolver 207 holding plural objective lenses 206 upward and downward, and thereby changes the relative distance between the observation sample 202 on the stage 203 and the objective lens 206, then thereby sets focus on the observation sample 202.

In the inverted microscope thus constituted, when observation and recording are carried out, motions will be illustrated as follow.

Firstly, preview mode (animation observing mode) is set according to the operation of the operating portion 231, and the image is displayed on the display device 230 such as LCD or the like. The objective lens 206a with low magnification is selected by rotating the revolver 207, and the image displayed on the display device 230 such as LCD or the like is focused by rotating the focusing handle 211. Then, it is switched to the objective lens with high magnification 206b by rotating the revolver 207, and when the focus is obscure, it is accurately focused by rotating the focusing handle 211 a little. When an observation position is changed, the position of the observation sample 202 is moved in an XY direction by operating the XY handle (not shown in the figure) of the stage 203, and a desire observation position is moved to the sight of the objective lens 206b.

Then, when the image is recorded in a recording medium such as MO, smart media or the like, the preview mode is switched to the recording mode by operating the operating portion 231. Then, the display of image recording is presented by photographing operation of the operating portion 231, the image data accumulated in the CCD 233 are recorded in the image recording part 235, and the motion is completed. Further, after completion of the image recording motion, it is automatically switched to the preview mode. The present image is displayed on the display device 230 such as LCD or the like in real time.

Accordingly, according to the present embodiment, since an observatory optical system for observing by the eyepiece is not required, the inverted microscope by which the observation and image recording by a monitor such as LCD or the like can be carried out can be realized by a simple configuration.

Figure 6:
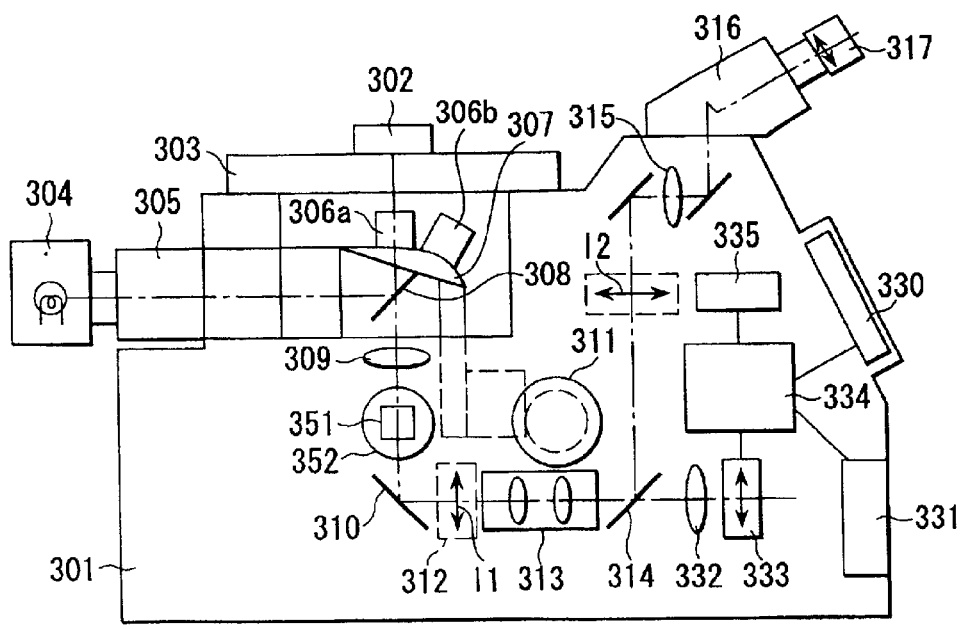
FIG. 6 is a figure showing an outline configuration of a third embodiment according to the present invention.

FIG. 6 is a view showing the schematic configuration of an inverted microscope according to a third embodiment of the present invention.

In FIG. 6, a stage 303 is arranged to the upper side of a microscope main body 301 (hereinafter, referred to as scope body). An observation sample 302 is mounted on the stage 303. Light flux by a halogen lamp or the like from a light source device 304 is introduced to the scope body 301 through a light projection tube 305. Then, the light flux is reflected by a half mirror 308, and irradiated on the observation sample 302 through the objective lens 306. In this case, an objective lens 306 are retained by a revolver 307 in a plural number, and arranged in light path in an alternative way. Then, the reflected light from the observation sample 302 transmits the half mirror 308, and the magnified image of the observation sample 302 is formed by the tube lens 309 together with the objective lens 306. Further, the reflected light is polarized to a horizontal direction by a mirror 310, and forms the primary image I1 of the observation sample 302.

Further, scales 312 for measuring the partial size of the observation sample 302 are designed to be able to be inserted at the position of a primary image I1.

Further, the primary image I1 passes a zoom optical system 313, and introduced to two light fluxes of the reflected light to perpendicularly upward direction when the mirror 314 is inserted on the optical path and the passage light to forward direction when the mirror 314 is removed from the optical path, by a mirror 314 of light path-splitting procedure which can be inserted and removed in the light path. The light flux reflected to a perpendicular direction is imaged as a secondary image I2, further, after being relayed by a relay optical system 315, entered in an eyepiece 317 attached at a mirror tube 316, and reaches at the eyes of an observer to be observed. On the other hand, the passage light to forward direction is contracted by a tube lens 332 which constitutes the imaging optical system, and imaged on a CCD 333.

Here, in FIG. 6, a splitting prism for diverging light flux to a horizontal direction (perpendicular direction to space) just under an tube lens 309, a side port 352 for photographing the light flux diverged in a splitting prism 351 by a television camera or the like, and a focusing handle 311 for focusing the observation sample 302 by driving to up and down the revolver 307 in which a plurality of the objective lenses 306 are retained and changing the relative distance between the objective lens 306 and the observation sample 302 on the stage 303, are shown.

The contraction magnification β of the above-mentioned tube lens 332 is set as follow. In this case, the same range as the range (the size at image face is called the number of sight) of a sample observed by the eyepiece 317 is designed to be able to be pictured. When the number of sight is FN and the diagonal length of imaging element is K, the relation is set as $\beta \approx K/FN$.

In front of the scope body 301, a display device 330 such as LCD or the like is buried. An operating portion 331 which sends various indications is provided at lower part of the front. Further, a signal processing part 334 connected with the CCD 333 and processes the signals from the CCD 333 is connected with an image recording part 335 to which an internal memory or an MO (magnetic optical disk) and smart media and the like as a recording medium etc. are attachable, the fore-mentioned display device 330 such as LCD or the like, and the operating portion 331, respectively.

In the inverted microscope thus constituted, since motions at carrying out observation and recording are quite the same as the inverted microscope illustrated in FIG. 5, illustration is omitted.

Accordingly, when such configuration is made, a range which is nearly the same range as the display range by a monitor can be observed by the eyepiece together with the observation by the monitor such as LCD or the like. Accordingly, the optimum inverted microscope can be provided to an observer who needs not only observation by the monitor but also observation by the eyepiece.

Further, in the above-mentioned second and third embodiments, when the direction of display face of the display devices 230 and 301 such as LCD or the like attached in front of the scope bodies 201 and 301 is designed to be shifted in accordance with the physical status and liking of an observer who faces the scope bodies 201 and 301, an observation posture which has less fatigue can be taken.

Figure 7A:
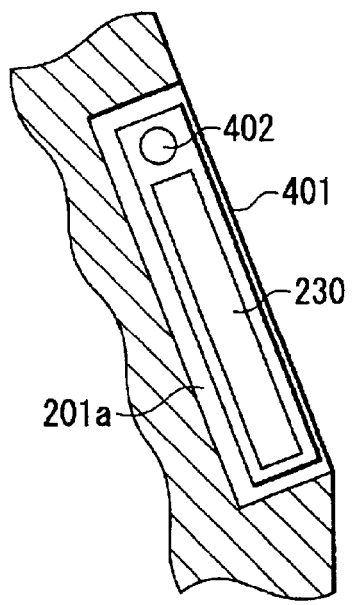
FIGS. 7A and 7B are diagrams showing an outline configuration of a modification of the second embodiment according to the present invention.
Figure 7B:
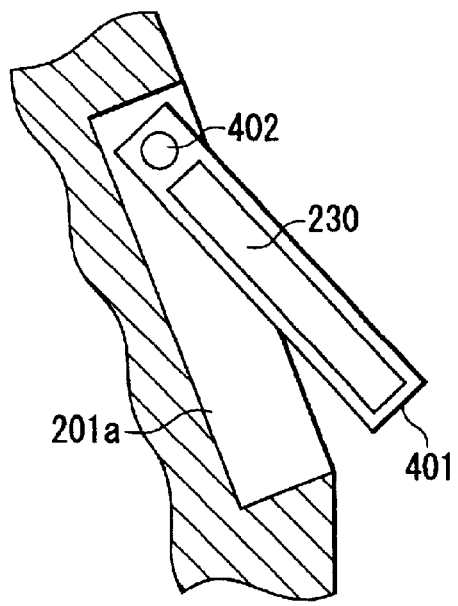

FIG. 7A and FIG. 7B are views showing an example of a configuration in which the display device 230 such as LCD or the like used for the second embodiment can be moved by swinging to up and down direction. FIG. 7A and FIG. 7B are section views magnified only a portion in which the display device 230 such as LCD or the like in front of the scope body 201 is attached. In FIG. 7A and FIG. 7B, the supporting shaft 402 is provided on a concave portion 201a provided in front of the scope body 201, to a horizontal direction (a vertical direction to space). The display device 230 such LCD or the like is supported in a condition in which it can be freely moved by swinging to up and down direction while fitting a retaining frame 401 which retains the display device 230 such as LCD or the like, with a supporting shaft 402. The fitting of the retaining frame 401 with the supporting shaft 402 is set so as to generate an appropriate frictional force which copes with a force to lower direction caused by the weight of the display device 230 such as LCD or the like including the retaining frame 401. Accordingly, an observer can freely adjust the angle to up and down direction of the display face of the display device 230 such as LCD or the like holding the retaining frame 401.

Figure 8A:
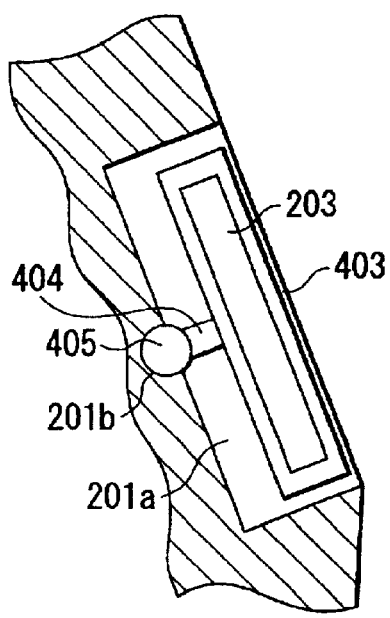
FIGS. 8A and 8B are diagrams showing an outline configuration of a modification of the second embodiment.
Figure 8B:
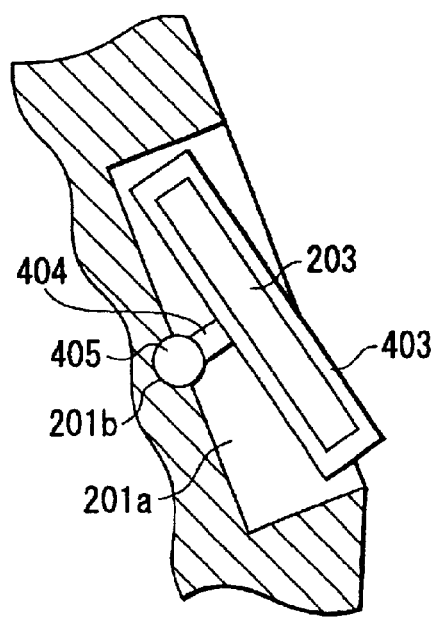

FIG. 8A and FIG. 8B are views showing an example of a configuration in which the display device 230 such as LCD or the like can be moved by swinging to up and down direction and right and left direction. FIG. 8A and FIG. 8B are section views which magnified only a portion in which the display device 230 such as LCD or the like in front of the scope body 201 is attached. In FIG. 8A and FIG. 8B, a spherical concave portion 201b is further formed in the concave portion 201a. The display device 230 such as LCD or the like is retained by a retaining frame 403. Further, spherical parts 405 fixed on the back face of the retaining frame 403 through a shaft 404 is fit in the spherical concave portion 201b. The fitting of the spherical parts 405 with the concave portion 201b is set so as to generate an appropriate frictional force which copes with a force to lower direction caused by the weight of the display device 230 such as LCD or the like including the retaining frame 403, in like manner as in FIG. 7A and FIG. 7B. Accordingly, an observer can freely adjust the angle of the display face of the display device 230 such LCD or the like, to up and down direction holding the retaining frame 403.

Further, although a cable was not shown in FIG. 7A and FIG. 7B and FIG. 8A and FIG. 8B, the cable from the signal processing part 234 located between the display face of the display device 230 such LCD or the like and the scope body 201 is set at an appropriate length so as to have no load, by the angle adjustment of the display face as described above.

Further, in the second embodiment, it becomes possible to change the size of the image displayed on the display device 230 such as LCD or the like, namely a so-called electronic zooming, by operation of the operating portion 231. Thus, an observer can freely change observation magnification by operation of the operating portion 231 in front of the scope body 201, without carrying out the switching operation of the objective lens 206 by the rotation of the revolver 207.

Thus, since the angle of the display face of the display device 230 such as LCD or the like can be freely changed, the inverted microscope in which an observation posture which has less fatigue can be taken in accordance with the physical status and liking can be provided.

In the above-mentioned illustration, the display device 230 such as LCD or the like used in the second embodiment is described, but, of course, the configuration shown in FIG. 7A to FIG. 8B can be applied to the display device 330 such as LCD or the like used in the third embodiment.

Figure 12A:
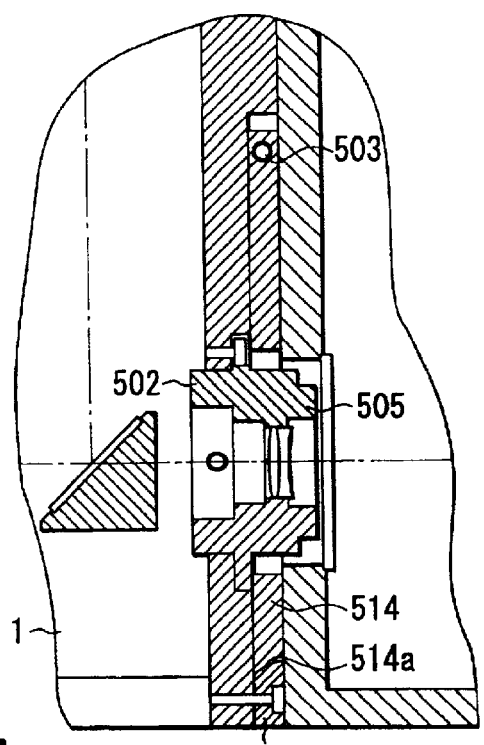
FIGS. 12A and 12B are diagrams showing a status wherein the photographing lens and the photographing device of FIG. 10A are attached to the front port of a scope body, and a status wherein the photographing lens and the TV camera 37 of FIG. 10C are attached thereto.
Figure 12B:
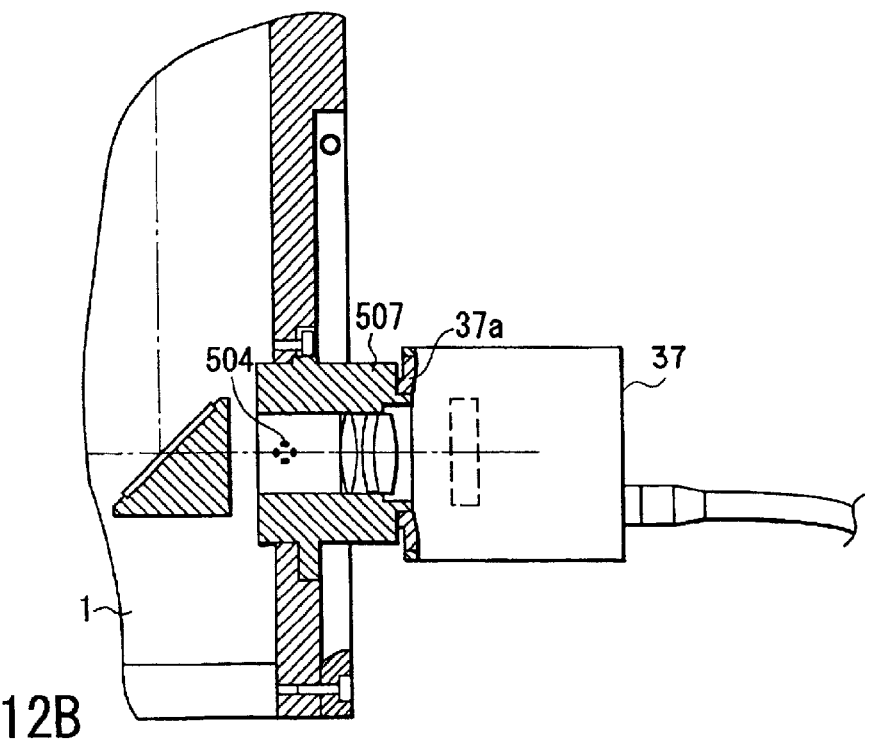

FIG. 9A and FIG. 12B are configuration views of an inverted microscope which is a fourth embodiment of the present invention.

In the fourth embodiment, although the configuration of the whole inverted microscope is the same as that of the first embodiment, but differs in illustration in detail concerning, the attachment method of photographing lenses which are used in combination when three image recording devices, namely, a photo photographing device to which a large size camera and a 35 mm film camera can be mounted, a digital camera device in which the observation of animation can be carried out by the display device such as LCD or the like internally stored, and a TV camera are selectively attached on the front port, and the attachment method of the photo photographing device and the digital camera device in the scope body.

In FIG. 9A and FIG. 12B, the same configuration as the first embodiment of FIG. 1 to FIG. 4 is illustrated by bestowing the same codes. In FIG. 9A and FIG. 9B, the scope body 1, the concave fitting part 1a for positioning a photo photographing device 19 provided in front of the scope body 1, a guide member 501 for positioning the photo photographing device 19 fixed at the lower end part of the fore-mentioned concave fitting part 1a and cooperates with the concave fitting part 1a, and a mounting member 502 for retaining the photographing lens unit described later fixed in front of the scope body 1, are shown. (Here, the front port 18 in FIG. 1=the mounting member 502 in a narrow sense, but the front port 18 in FIG. 1=the mounting member 502+the concave fitting part 1a+the guide member 501 in a wide sense, namely, it can be said that the mounting member 502 is one of configuration member of the front port 18). Further, in FIG. 9A and FIG. 9B, the scope body 1, a fixation screw 503 for fixing the photo photographing device 19 fit in the fore-mentioned concave fitting part 1a, a fixation screw 504 for fixing the photographing lens described later fit in the fore-mentioned mounting member 502, and the mirror frame 500 which retains the mirror 14 and is retained at a predetermined position of the scope body 1 in a condition in which it can be inserted and removed against light path, are shown.

Figure 10A:
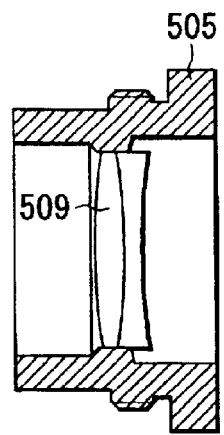
FIGS. 10A through 10D are diagrams showing photographing lenses for 3 image recording devices, i.e., a photographing device to which a large size film camera and a 35 mm film camera can be attached, a digital camera device that enables moving image observation by a display device such as LCD or the like built therein, and a TV camera.
Figure 10B:
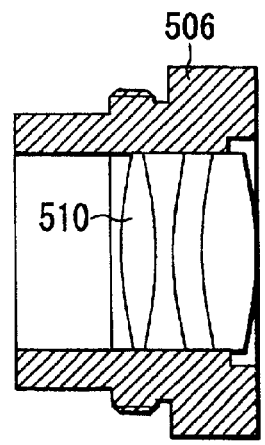

FIG. 10A and FIG. 10B show photographing lenses corresponding to three image recording devices, namely, the photo photographing device which can mount a large size camera and a 35 mm film camera, a digital camera device in which the observation of animation can be carried out by the display device such as LCD or the like internally stored, and a TV camera.

Figure 10C:
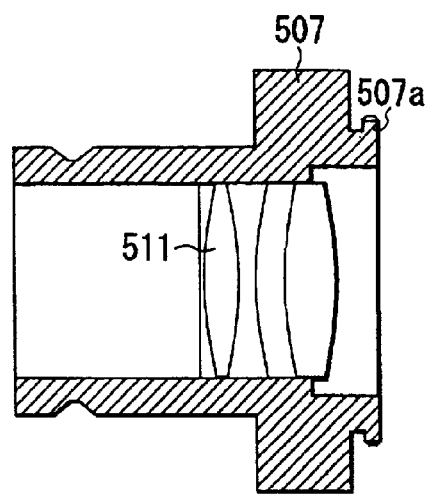
Figure 10D:
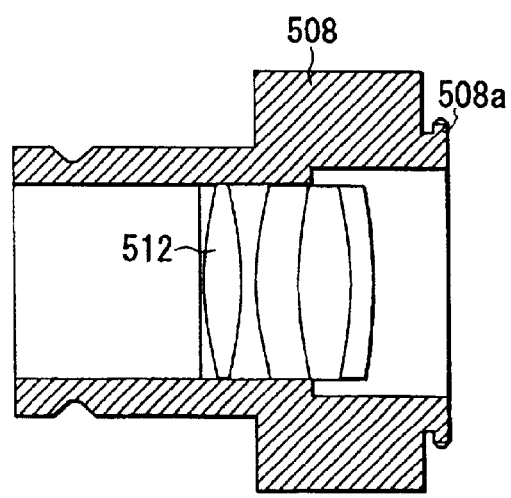

FIG. 10A is a view showing photographing lens unit corresponding to the photograph device 19. FIG. 10B is a view showing photographing lens unit corresponding to the digital camera device 29. FIG. 10C is a view showing photographing lens unit corresponding to the TV camera 37. FIG. 10D is a view showing photographing lens unit corresponding to a TV camera which is different from the TV camera 37.

Both of the photographing lens unit corresponding to the photo photographing device 19 of FIG. 10A and the photographing lens unit corresponding to the digital camera device 29 of FIG. 10B are equipped with screws at the outer peripherals of respective lens frames 505 and 506. Further, the lens frames 505 and 506 can be attached on the mounting member 502 by screwing the screws of the outer peripherals of the lens frames 505 and 506 in screw parts 502a of the fore-mentioned mounting member 502.

Both of the photographing lens unit corresponding to the TV camera 37 of FIG. 10C and the photographing lens unit corresponding to a TV camera which is different from the TV camera 37 of FIG. 10D are equipped with V-grooves on the outer peripherals of lens frames 507 and 508. Further, the lens frames 507 and 508 can be attached on the mounting member 502 by inserting the lens frames 507 and 508 in fitting parts 502b of the fore-mentioned mounting member 502, and screwing the fixation screws 504. Further, at one end of the lens frames 507 and 508, camera attachment screw portions 507a and 508a such as C mount or the like for fixing the TV camera are provided.

In the lens frames 505, 506, 507 and 508, lens groups 509, 510, 511 and 512 which have different magnifications respectively are fixed. When photographing is carried out using the photographing device 19 in combination, the lens group 509 is an optical system having about 3-fold so as to be finally the optimum expanded magnification on a film face. The lens groups 510, 511 and 512 have the optimum contraction magnification according to the digital camera device 29 used in combination and the size of the imaging element such as CCD or the like of the TV camera 37. As the fore-mentioned third embodiment, when the number of sight is FN, the diagonal length of imaging element is K, and the magnification of the lens groups of photographing lens β is set $\beta \approx K/FN$, the range which is nearly the same range as the eyepiece can be imaged.

Figure 11A:
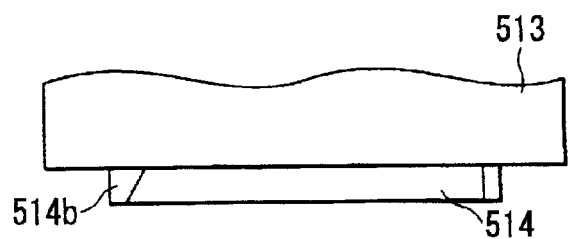
FIGS. 11A through 11C are diagrams showing the shape of an attachment portion of a photographing device or a digital camera device.
Figures 11B, 11C:
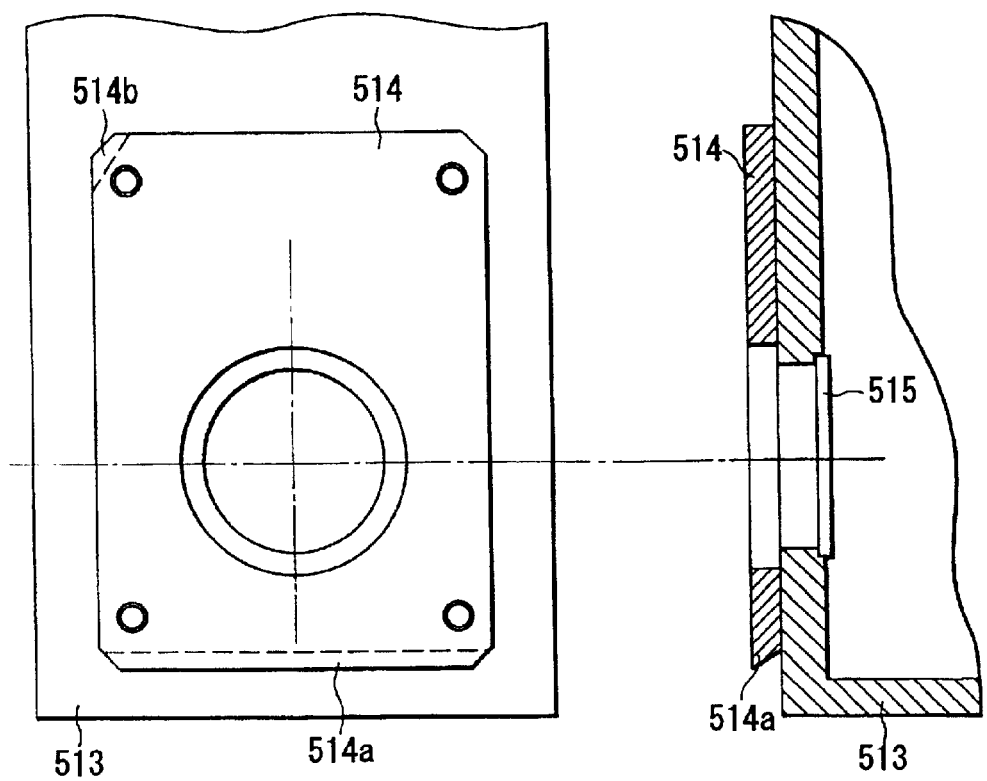

FIG. 11A to FIG. 11C are views showing the form of the attachment portion of the photo photographing device 19 or the digital camera device 29. In FIG. 11A to FIG. 11C, a main body part 513 of the photo photographing device 19 or the digital camera device 29, an attachment member 514 fixed in the main body part 513, and a dust proof glass 515 fixed on the opening of the main body part 513, are shown. The lower end part of the attachment member 514 has a slope portion 514a corresponding to the fore-mentioned guide member 501. At one side of the upper end of the attachment member 514, a slope portion 514b constituted so that when the fore-mentioned fixation screws 503 are screwed, the fixation screws 503 just contact with the attachment member 514 and a force pushing the attachment member 514 to the direction of the scope body 1 acts, is formed. Further, the width dimension of the attachment member 514 is equal to the width dimension of the concave fitting part 1a of the scope body 1.

Then, FIG. 12A is a view showing a condition in which the photographing lens of FIG. 10A and the photographing device 19 are attached in the frontal port of the scope body 1. FIG. 12B is a view showing a condition in which the photographing lens of FIG. 10C and the TV camera 37 are attached in the frontal port of the scope body 1.

In FIG. 12A, the photographing device 19 is fixed on the scope body 1. The lens frame 505 of the photographing lens unit of FIG. 10A is screwed in the mounting member 502 fixed in the front of the scope body 1 to be fixed. Then, the width direction of the attachment member 514 is fit in the concave fitting part 1a of the fore-mentioned scope body 1 so that the slope portion 514a of the lower end of the attachment member 514 of the photo photographing device 19 is mounted on the fore-mentioned guide member 501, and the fixation screws 503 are screwed.

Thus, in the present embodiment, when large size devices such as the photo photographing device 19 and the digital camera device 29 are attached, the devices are not directly fixed on the mounting member 502. The photographing lens is fixed in the mounting member 502, and then the photograph device 19 and the digital camera device 29 are designed to be attached in the frontal part of the scope body 1. Accordingly, a highly accurate and stable combination can be made.

In FIG. 12B, the TV camera 37 is fixed in the scope body 1 as follows. The camera attachment screw portion 507a of the lens frame 507 of the photographing lens unit of FIG. 10C is screwed in the mounting part 37a of the TV camera 37 to be fixed. Then, the lens frame 507 of the photographing lens unit of FIG. 10C in which the TV camera 37 is inserted in the fitting part 502b of the fore-mentioned mounting member 502. Then, after the up and down and left and right directions of the TV camera 37 are adjusted, the fixation screws 504 are screwed. Thus, the TV camera 37 is fixed in the scope body 1 through the photographing lens unit of FIG. 10C.

When the photographing lens unit of FIG. 10D is attached, it can be attached in like manner as in the photographing lens unit of FIG. 10C.

Further, the reason why the fixation method for the mounting member 502 of the photographing lens corresponding to the TV camera 37 was changed against the photographing lens corresponding to the photo photographing device 19 and the digital camera device 29 is for being able to adjust the up and down and left and right directions of the TV camera 37.

As described above, in the present embodiment, when the photo photographing device 19 and the digital camera device 29, and the TV camera 37 are attached on the frontal port, the photographing lenses are attached by different methods, and a proprietary structure for attaching the photograph device 19 and the digital camera device 29 in the scope body is prepared. Accordingly, even a large size film photographing device and the digital camera device can be attached in the scope body in a high rigidity and good stability.

Further, in case of the photo photographing device 19 and the digital camera device 29, the photographing lens is designed to be also attached in the scope body 1 by being separated from the photo photographing device 19 and the digital camera device 29 as a separate body. Accordingly, the image recording having various magnifications corresponding to the request of an observer can be carried out. Specifically, in case of the present embodiment, the photographing lenses shown in FIG. 10A and FIG. 10B are designed to be used in combination corresponding to the photo photographing device 19 and the digital camera device 29. To the contrary, corresponding to a case of each of the photo photographing device 19 and the digital camera device 29, for example, 2 or more of the photographing lenses having different magnifications can be also provided.

Then, an inverted microscope according to a fifth embodiment of the present invention will be illustrated.

Since the fifth embodiment has the same configuration as that of the third embodiment illustrated in FIG. 6, illustration and the display of drawing are omitted. The fifth embodiment has a characteristic of setting the magnification of the photographing lens 332 at being photographed by CCD 333. Namely, in the present embodiment, it is constituted so that the magnification of the image displayed by the display device 330 such as LCD or the like is equal to the observation magnification at the eyepiece 317.

When the magnification of the photographing lens 332 is β', the diagonal length of CCD 333 is K, the diagonal length of the display device 330 such as LCD or the like is L, and the magnification of the eyepiece 317 is M, an observer can always observe the observation magnification at the eyepiece 317 equal to the magnification of the image displayed by the display device 330 such as LCD or the like by selecting the respective parameters so that the following relation is obtained:

$M=\beta' \cdot L/K$ ($\beta'=M \cdot K/L$), therefore he can carry out observation work without any sense of incongruity.

In FIG. 13, when the magnification at the eyepiece 317 is most standard 10-fold, a table of the magnification of the photographing lens 332 for observing at 10-fold equal to the same magnification of the eyepiece 317 in the display device 330 such as LCD or the like, in case of a combination of the sizes of the typical CCD 333 and the display device 330 such as LCD or the like.

Then, an inverted microscope according to a sixth embodiment of the present invention will be illustrated.

Since the sixth embodiment has also the same configuration as that of the third embodiment illustrated in FIG. 6, illustration and the display of drawing are omitted.

In the present embodiment, when the sight number of the eyepiece 317 is FN and the diagonal length of the imaging element 333 such as CCD or the like is K, the magnification β of the photographing lens 332 is set so as to satisfy $\beta = K/FN$.

As shown in FIG. 15 (view in which the operating portion is viewed from the front), switches 601 and 602 for inputting the UP and DOWN of electronic zoom magnification for being able to change display magnification to the display device 330 such as LCD or the like, a display portion 603 for displaying the electronic zoom magnification, MEMORY switches 604a to 604c for storing the present electronic zoom magnification set, and an EXPO switch 605 for recording the image displayed in the image recording part 336, and the like are arranged in the operating portion 331.

The signal processing part 334 which processes the output from CCD 333 has a memory for temporarily preserving image data from CCD 333. When the electronic zoom magnification is input from the operating portion 331 to be set, the signal processing part 334 cut out a portion from the image data temporarily preserved in the memory in accordance with the electronic zoom magnification, and displays the range cut out on the display device 330 such as LCD or the like. When the electronic zoom magnification is 0.5-fold, a range of a half of the original data for the respective vertical and horizontal at around center is cut out from the image data temporarily preserved in the memory, and the data is displayed on the display device 330 such as LCD or the like. Thus, the image having 2-fold of the electronic zoom magnification is obtained.

In order to store the electronic zoom magnification, it is realized by continuously pushing any one of the MEMORY switches 604a to 604c, for example, for a fixed time or more in a condition in which it is set at the electronic zoom magnification desired to be stored. The electronic zoom magnification stored is called out by pushing any one of the MEMORY switches 604a to 604c for a short time, and the image can be displayed at the electronic zoom magnification on the display device 330 such as LCD or the like. Since the processing of cutting out (thin out) a portion from the image data temporarily preserved in the memory is well known, it is omitted here.

As shown in FIG. 14, in the present embodiment, when ⅔ inch-sized CCD was adopted as CCD 333, 0.42-fold is set as the magnification β of the tube lens 332 in order to obtain the same imaging range as the observation range of the number of sight FN=26.5. Further, a 6-type monitor is assembled as the display device 330 such as LCD or the like.

Then, when the electronic zoom magnification is set at 1.7-fold by the switch 601 which displays the UP of the electronic zoom magnification, the display magnification on the display device 330 such as LCD or the like is 0.42× 1.7≈0.72, and it is quite the same as the magnification 0.72 of the tube lens for obtaining the same display magnification as the observation magnification (10-fold) at the eyepiece 317 in FIG. 13.

Accordingly, when it is desired according to the liking of an observer that the area of the image imaged by CCD 333 is nearly equal to the observation area at the eyepiece 317, the image data imaged by CCD 333 with the tube lens may be displayed in full image as it is, on the display device 330 such as LCD or the like without using electronic zoom. On the other hand, when the image is desired to be observed at the same magnification with the eyepiece 317 on the display device 330 such as LCD or the like, it may be displayed in a magnified display utilizing the electronic zoom. Further, since a plurality of the magnifications (here, until three) of the electronic zoom, it can be observed at an arbitrary magnification on the display device 330 such as LCD or the like. Although not illustrated, when a printer is directly connected with the present inverted microscope and the image temporarily preserved in the signal processing part 334 is printed by the printer, or when the image preserved in the image recording part 335 is printed by an external printer through a recording medium such as smart media or the like, it is easily realized, for example, to coincide the magnification of the print image with the observation magnification (here, 10-fold) at the eyepiece 317 on the output paper of the external printer by empirically setting the electronic zoom magnification corresponding to the printer used and the output paper, utilizing the function of storing a plurality of the fore-mentioned electronic zoom magnification.

An inverted microscope according to a seventh embodiment of the invention is illustrated. Since the total configuration of the inverted microscope related to the seventh embodiment is the same as FIG. 2A and FIG. 2B, illustration and the display of drawing are omitted.

Figure 16:
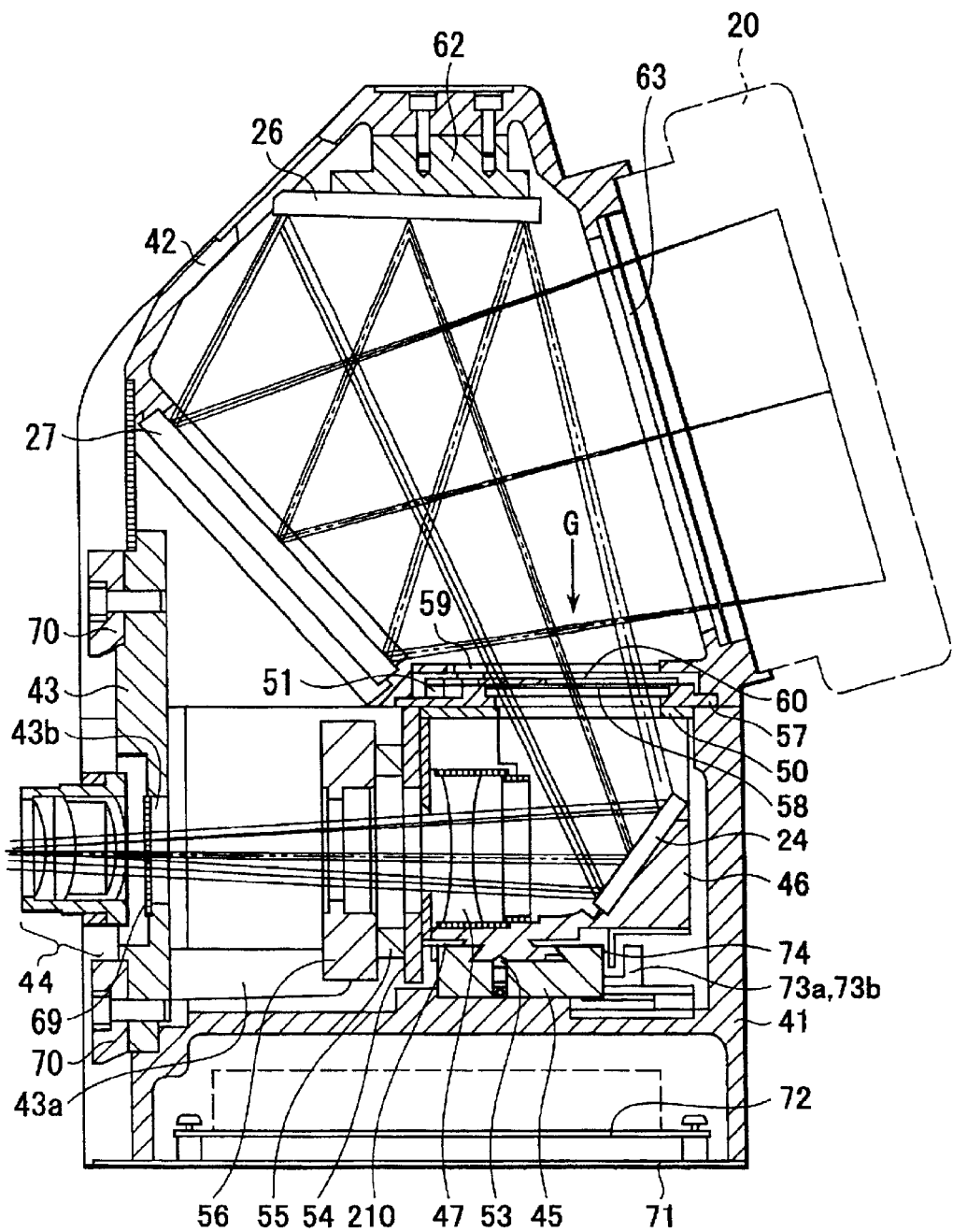
FIG. 16 is a cross sectional view of a microscope photographing device to be applied to an inverted microscope according to a seventh embodiment of the present invention.
Figure 17:
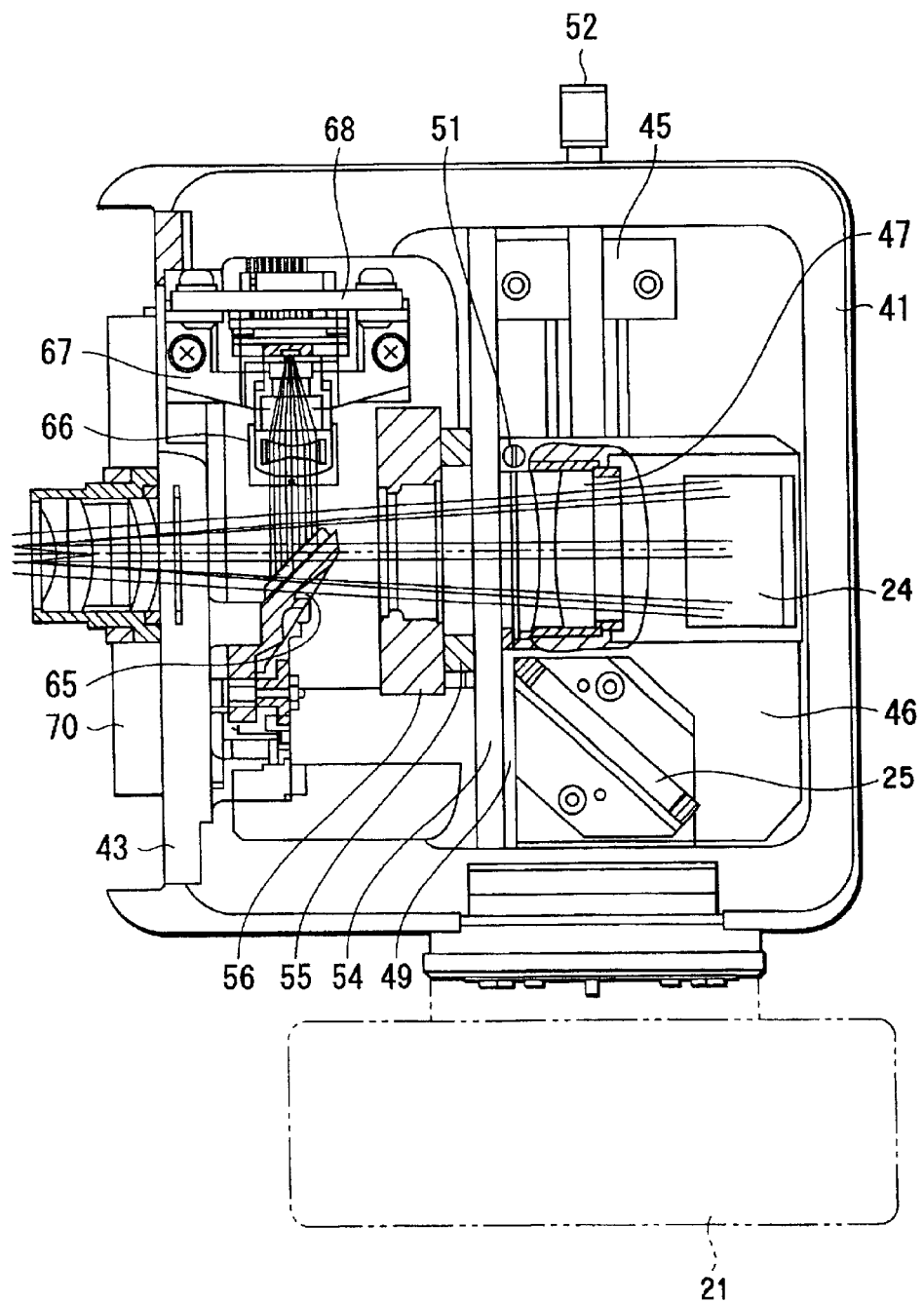
FIG. 17 is a view showing a condition for photographing by a large size film camera of the microscope photographing device to be applied to the inverted microscope according to the seventh embodiment.
Figure 18:
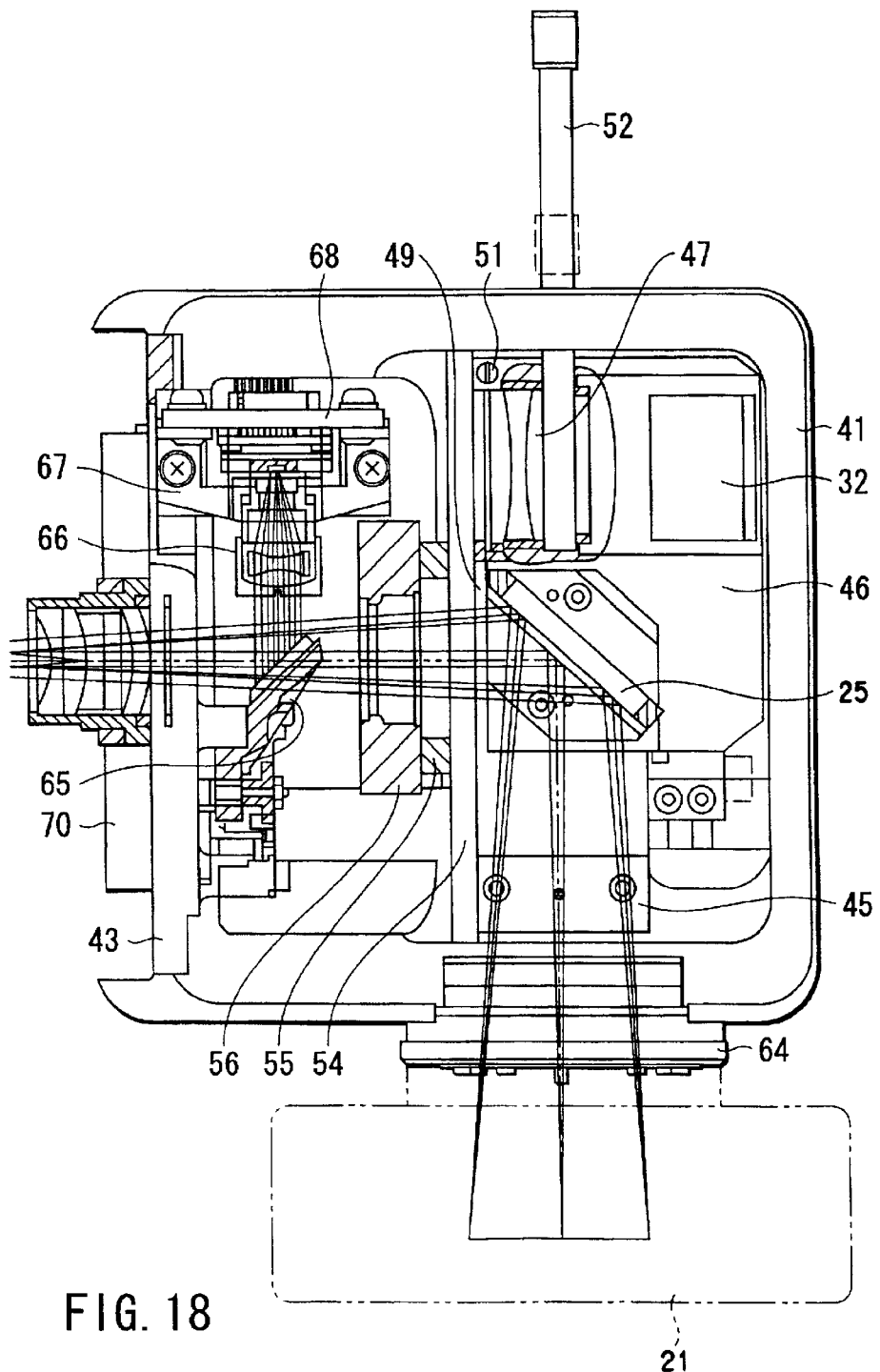
FIG. 18 is a view showing a condition for photographing by a 35 mm film camera of the microscope photographing device to be applied to the inverted microscope according to the seventh embodiment.

FIG. 16 is a side sectional view of the microscope photograph device applied to the inverted microscope related to the seventh embodiment, and FIG. 17 and FIG. 18 are views in which the lower half side of the microscope photograph device was viewed from upside. FIG. 17 shows a condition in which photograph is carried out by a large size film camera and FIG. 18 shows a condition in which photograph is carried out by a 35 mm film camera, respectively.

In FIG. 16 to FIG. 18, three parts such as a photograph main body 41 which retains the principal part of the photo photographing device, the upper cover 42 fixed on the upper face of the photograph main body 41, and a base plate 43 fixed on the photograph main body 41 and constituted so that it covers the photograph main body 41 and the back face of an upper cover 42 are the appearance configuration parts of the microscope photograph device.

The photo projection lens part set 44 (photo projection lens) is assembled in the scope body 1, and the imaging flux from the scope body 1 is converted to an imaging flux having high magnification which is suitable for photo photographing.

Further, optical path switching block 46 is fit to a sliding fantail part of a base part (hereinafter, referred to as the optical path switching base) 45, which leads imaging flux to the large size film camera 20 or the 35 mm camera 21.

On the optical path switching block 46, a projection lens part set 47 for a large size film camera 20 for magnifying and projecting the imaging flux from the scope body 1 to the magnification which is suitable for a large size film camera 20, the reflection mirror 24 for the first large size film camera for polarizing to a slant upper direction the imaging flux which passed the projection lens part set 47 for a large size film camera, a reflection mirror 25 for a 35 mm film camera for polarizing the imaging flux from the scope body 1 to the 35 mm film camera, a first iris plate 49 for stopping the imaging flux from the scope body 1 to the requisite flux diameter to the 35 mm film camera, a second iris plate 50 in which a square hole through which only the flux reflected by the reflection mirror 24 for the first large size film camera passes was provided, and a linking pin 51, are fixed, respectively.

An optical path switching operation lever 52 which is protruded from the side face of the main body 41 to outside is fixed on the side face of the optical path switching block 46. A positioning mechanism 53 is a ball click and the like for positioning the optical path switching block 46 at either the photograph position by the large size film camera 20 or the photograph position by the 35 mm film camera 21.

When the optical path switching operation lever 52 is pushed in and the optical path switching block 46 is located at the left side viewed from the observer of the microscope (the large size film camera 20 side), the projection lens part set 47 for a large size film camera and the reflection mirror 24 for a large size film camera are inserted in the imaging flux. Then, the optical path switching operation lever 52 is pulled out, and when the optical path switching block 46 is located at the right side viewed from the observer of the microscope (the large size film camera 20 side), the reflection mirror 25 for a 35 mm film camera is inserted in the imaging flux.

An electromagnetic shutter base 54 is fixed on the side face of the optical path switching base 45, and retains an electromagnetic shutter 56 for carrying out a photographing motion through a ring shape elastic member 55. According to the above-mentioned configuration, the electromagnetic shutter 56 is arranged at about the iris position of the imaging flux emitted from the scope body 1.

A mechanical shutter base 57 is equipped with an opening in which the imaging flux toward the large size film camera 20 can pass, at the central part, and fixed on the lower face of the upper cover 42. A mechanical shutter 58 slides along the guide grooves which are formed on the upper face of the mechanical shutter base 57, and is a mechanical shutter which can perfectly block the opening of the fore-mentioned mechanical shutter base 57. A supporting shaft 59 is a supporting shaft fixed on the upper face of the mechanical shutter base 57. A link levers 60 are rotatably retained making the supporting shaft 59 as fulcrum.

These link levers 60 and the mechanical shutter 58 motion in link with the fore-mentioned optical path switching block 46 by action of the fore-mentioned link pins 51.

Then, the aspect of the link motion is illustrated referring to FIG. 19, FIG. 20, FIG. 21A to FIG. 21D.

Figure 19:
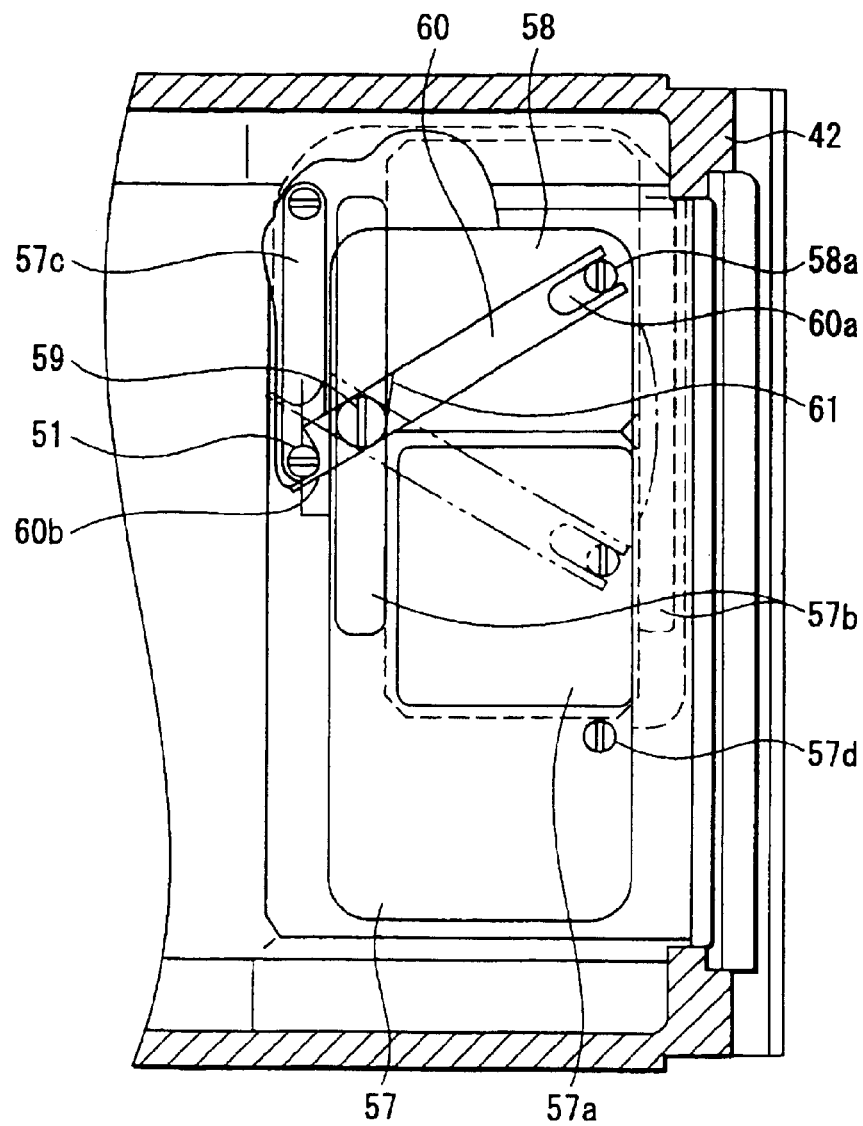
FIG. 19 is a diagonal appearance viewed from the direction G in FIG. 16 to the direction of a mechanical shutter.
Figure 20:
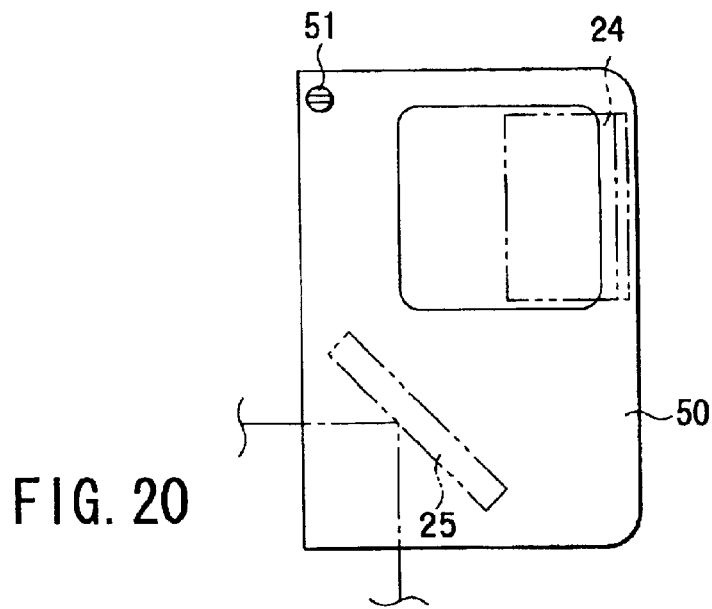
FIG. 20 is a view of a second throttle plate viewed from the direction G.

FIG. 19 is a G-arrow view in which the direction of the mechanical shutter 58 is viewed from the direction of G of FIG. 16. FIG. 19 shows a condition in which the optical path switching block 46 is located at the left side and the photographing by the large size film camera 20 can be carried out. FIG. 20 is a view in which the second iris plate 50 fixed on the upper face of the optical path switching block 46 and in which a square hole in which only the flux reflected by the reflection mirror 24 for a large size film camera passes is provided is viewed from the G direction.

In FIG. 19, the mechanical shutter base 57 is fixed on the lower face of the upper cover 42. The opening of the upper cover 42 is blocked by attaching the mechanical shutter base 57, and the residual opening is only an opening 57a provided in the mechanical shutter base 57. The mechanical shutter can be freely moved by sliding along the guide grooves formed by a pair of a projection parts 57b.

The long holes 57c which are provided in the mechanical shutter base 57 is a size corresponding to the range in which the link pins 51 fixed on the upper face of the optical path switching block 46 works at switching the light pass.

A groove 60a is formed in one end of the link lever 60. A shutter pin 58a fixed on the upper face of the mechanical shutter 58 is fit in a groove 60a. The another end of the link lever 60 is a contact portion 60b with which the link pin 51 is brought in contact, and the contact portion 60b of the link lever 60 is always brought in contact with the link pin 51 by the clock wise energized force given by the coil spring 61 attached on the supporting shaft 59 which rotatably retains the link lever 60.

In FIG. 19, since the optical path switching block 46 is located at the left side, it is in a condition in which the photographing by the large size film camera 20 can be carried out. Accordingly, since the link pin 51 is located at the lower side in FIG. 19, the mechanical shutter 58 is in a condition in which it does not block the opening 57a of the mechanical shutter base 57 by the link lever 60 which is brought in contact with the link pin 51.

At this time, the opening of the mechanical shutter base 57 shown in FIG. 20 is duplicated with the opening 57a of the above-mentioned mechanical shutter base 57, and the imaging flux reflected with the reflection mirror 24 for a large size film camera passes the opening 57a. Further, when the mechanical shutter 58 blocks the opening 57a of the mechanical shutter base 57, the end face of the mechanical shutter 58 hits the stopper pin 57d fixed on the upper face of the mechanical shutter base 57.

Referring to FIG. 21A to FIG. 21D, the aspect of a case in which the link lever 60 and the mechanical shutter 58 motion by linking with the fore-mentioned optical path switching block 46 by the action of the fore-mentioned link pin 51 is illustrated in detail.

FIG. 21A shows a condition in which the mechanical shutter 58 by which the photographing by the large size film camera 20 which is the same as FIG. 19 can be carried out is photographing. FIG. 21B shows an intermediate condition in which the optical path-switching operation lever 52 is pulled out a little (here, for example, 7.5 mm). FIG. 21C shows an intermediate condition in which the optical path-switching operation lever 52 is further pulled out more slightly (here, for example, 11 mm) than FIG. 21B. FIG. 21D shows a condition in which the optical path-switching operation lever 52 is perfectly (here, for example, 40 mm of whole stroke) pulled out and the photographing by the 35 mm film camera is possible.

When the optical path-switching operation lever 52 is slightly pulled out as shown in FIG. 21B, the second iris plate 50 fixed on the optical path switching block 46 and the link pin 51 move by the pulled-out amount of the optical path switching operation lever 52, and the link lever 60 which is brought in contact with the link pin 51 rotates to a clockwise direction by the energizing force of the coil spring 61. Then, the mechanical shutter 58 moves through the shutter pin 58a fit in the grove 60a of the one end part of the link lever 60, and blocks the portion among the opening 57a of the mechanical shutter base 57.

At this time, since the second iris plate 50 moves also slightly, only the region shown by the oblique line of FIG. 21B is a range in which light can be passed to the first reflection mirror 24 for a large size film camera fixed on the optical path switching block 46 from an upper direction. The region shown by the reticulated part of FIG. 21B is blocked by the second iris plate 50 even if light is invaded from an upper direction, and is a range in which light does not reach at the first reflection mirror 24 for a large size film camera fixed on the optical path switching block 46.

As shown in FIG. 21C, when the optical path-switching operation lever 52 is pulled out, for example, by 11 mm, the mechanical shutter 58 moves further, and blocks perfectly the opening 57a of the mechanical shutter base 57. Accordingly, the light invaded from an upper direction cannot reach at the direction of the optical path switching block 46.

As shown in FIG. 21D, even if the optical path switching operation lever 52 is perfectly pulled out, the mechanical shutter 58 is yet in a condition in which it blocks perfectly the opening 57a of the mechanical shutter base 57, and the light invaded from an upper direction cannot reach at the direction of the inner optical path switching block 46.

Thus, since the light path is directly blocked by the action of the link lever with the mechanical shutter 58 by only pulling out the inner optical path switching block 46 from the condition as shown in FIG. 21A in which the photographing by the large size film camera 20 can be carried out, the light path is blocked to the utmost except a requisite time.

If the large size film camera 20 is removed by the observer of the microscope in the condition of FIG. 21A in which the photographing by the large size film camera 20 can be carried out and in the intermediate condition of FIG. 21B, light from outside invades into the first reflection mirror 24 for a large size film camera fixed on the optical path switching block 46 through the opening 57a of the mechanical shutter base 57. However, the light from outside which invaded is reflected by the first reflection mirror 24 for a large size film camera, and all of the light reaches to the direction of the electromagnetic shutter 56 through the projection lens part set 27 for a large size film camera, therefore it does not reach to the direction of the 35 mm film camera 21 at all.

When the 35 mm film camera 21 is suddenly removed by the observer of the microscope, the light from outside invades from the 35 mm film camera 21 side. However, if the optical path switching operation lever 52 is pulled out and in a condition in which the photographing by the 35 mm film camera 21 can be carried out, the mechanical shutter 58 perfectly blocks the opening 57a of the mechanical shutter base 57, therefore the light from outside does not reach to the direction of the large size film camera 20 at all.

Further, if the optical path-switching operation lever 52 is pushed in, the external light which invaded from the 35 mm camera 21 side does not reach to the direction of the large size film camera 20 at all because it is wholly reflected to the direction of the electromagnetic shutter base 54 by the reflection mirror 25 for a 35 mm film camera.

When the optical path switching operation lever 52 is situated at an intermediate position, the external light which invaded from the 35 mm film camera 21 side does not yet reach to the direction of the large size film camera 20 at all because it is wholly reflected to the direction of the electromagnetic shutter base 54 by the reflection mirror 25 for a 35 mm film camera.

Returning again to FIG. 16, FIG. 17 and FIG. 18, the photograph device will be illustrated.

When the optical path switching operation lever 52 is pushed in as shown in FIG. 17, the imaging flux reflected by the first reflection mirror 24 for a large size film camera fixed on the inner optical path switching block 46 passes the opening 57a of the mechanical shutter base 57 without being blocked by the mechanical shutter 58. Then, the light flux which passed the opening 57a becomes the imaging flux to obliquely forward by being reflected by the second reflection mirror 26 for a large size film camera fixed on the uppermost part of the upper cover 42 through the mirror fixation member 62 and the third reflection mirror 27 for a large size film camera fixed on the back face side of the upper cover 42. Then, it passes the dust proof glass 63 fixed in front of the said upper cover 42 of the imaging flux and imaged on the large size face of the large size film camera 20.

When the optical path switching operation lever 52 is pulled out as shown in FIG. 18, the imaging flux reflected by the first reflection mirror 25 for a 35 mm film camera fixed on the inner optical path switching block 46 passes the opening of the 35 mm film camera mount 64 fixed on the side face of the photograph main body 41, and imaged on the film face of the 35 mm film camera 21.

When the electromagnetic shutter 56 and the mechanical shutter 58 are in a closed condition, the first space completely closed by the large size film camera 20 and the mechanical shutter 58 and the second space completely closed by the electromagnetic shutter 56, the mechanical shutter 58 and the 35 mm film camera 21.

Further, although display by the drawing is omitted in FIG. 16, the repulsive mirror part set 65 in which the portion of around the center among the imaging flux is reflected in front of photographing and evacuated from the imaging flux to pass as it is, is arranged between the photograph projection lens 27 and the electromagnetic shutter 56 as shown in FIG. 17 and FIG. 18.

The imaging flux reflected by the repulsive mirror part set 65 is focused by the projection lens part set 66 for measurement, and enter into the light measurement element 68 such as a photo-diode or the like attached on the attachment member 67 fixed on the projection part 43a of the base plate 43.

The dust proof glass 69 is fixed at the opening 43b of the base plate 43 to which the imaging flux form the scope body 1 firstly enters into the photograph device. Further, the fixation member 70 for attaching the photo photographing device in the scope body 1 is fixed at the back face side of the base plate 43.

The cover plate 71 is fixed on the bottom face of the photograph main body 41. The control substrate 72 on which CPU for controlling the respective parts of the photo photographing device 28 such as the electromagnetic shutter 56 or the like is mounted is attached on the upper face of the cover plate 71.

Further, two positions of the optical path switching block 46, namely, two position detection sensors 73a and 73b such as a photo-interrupter and the like corresponding to the position at which the photographing by the large size film camera 20 can be carried out and the position at which the photographing by the 35 mm film camera 21 can be carried out, are attached at the optical path switching base 45. The two position detection sensors 73a and 73b cooperate with the sensor plate 74 fixed in the optical path switching block 46, and the two positions of the optical path switching block 46 can be detected.

Further, when the optical path switching block 46 is located at an intermediate position which is not the position at which the above-mentioned photographing by the large size film camera 20 can be carried out and the position at which the photographing by the 35 mm film camera 21 can be carried out, for example, in a condition shown in FIG. 21B and FIG. 21C, either of two position detection sensors 73a and 73b of the photo-interrupter and the like do not detect the optical path switching block 46, therefore it can be judged that the optical path switching block 46 is located at an intermediate position.

Figure 22A:
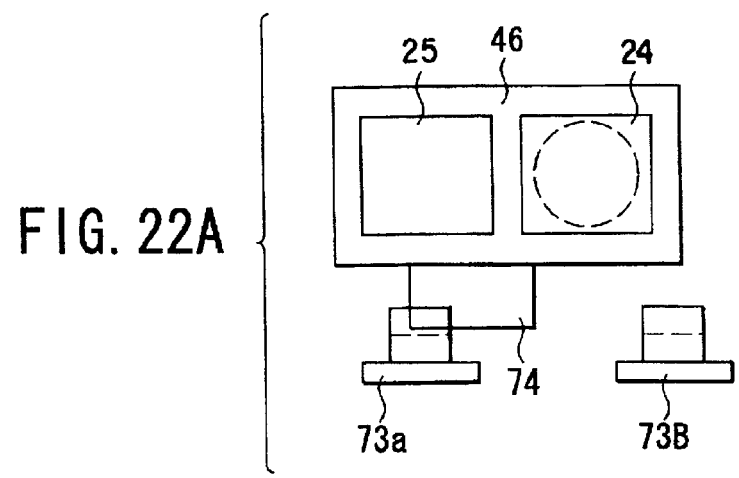
FIGS. 22A and 22B are diagrams showing positional relations between 2 position sensors and a light path switching block in one embodiment of a microscope photographing device according to the present invention.
Figure 22B:
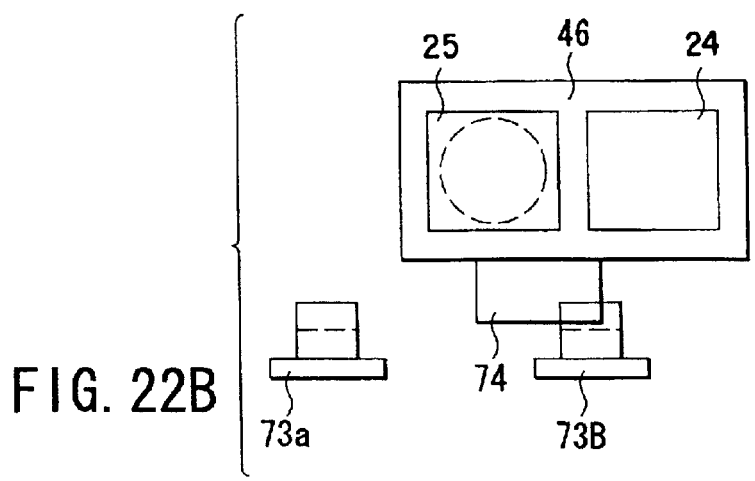

FIG. 22A and FIG. 22B are views showing the relation of the two position detection sensors 73a and 73b with the optical path switching block 46. FIG. 22A shows a condition in which the optical path switching block 46 is located at the left side viewed from the frontal side of the photo-photographing device (the large size film camera 20 side) and the imaging flux is reflected by the first reflection mirror 24 for a large size film camera. In this case, the detection sensor 73a is blocked by the left end side of the sensor plate 74 fixed in the optical path switching block 46, and the optical path switching block 46 is detected.

FIG. 22B shows a condition in which the optical path switching block 46 is located at the right side viewed from the frontal side of the photo photographing device 28 (the large size film camera 20 side) and the imaging flux is reflected by the reflection mirror 25 for a 35 mm film camera. In this case, the detection sensor 73b is blocked by the right end side of the sensor plate 74 fixed in the optical path switching block 46, and the optical path switching block 46 is detected.

Figure 23:
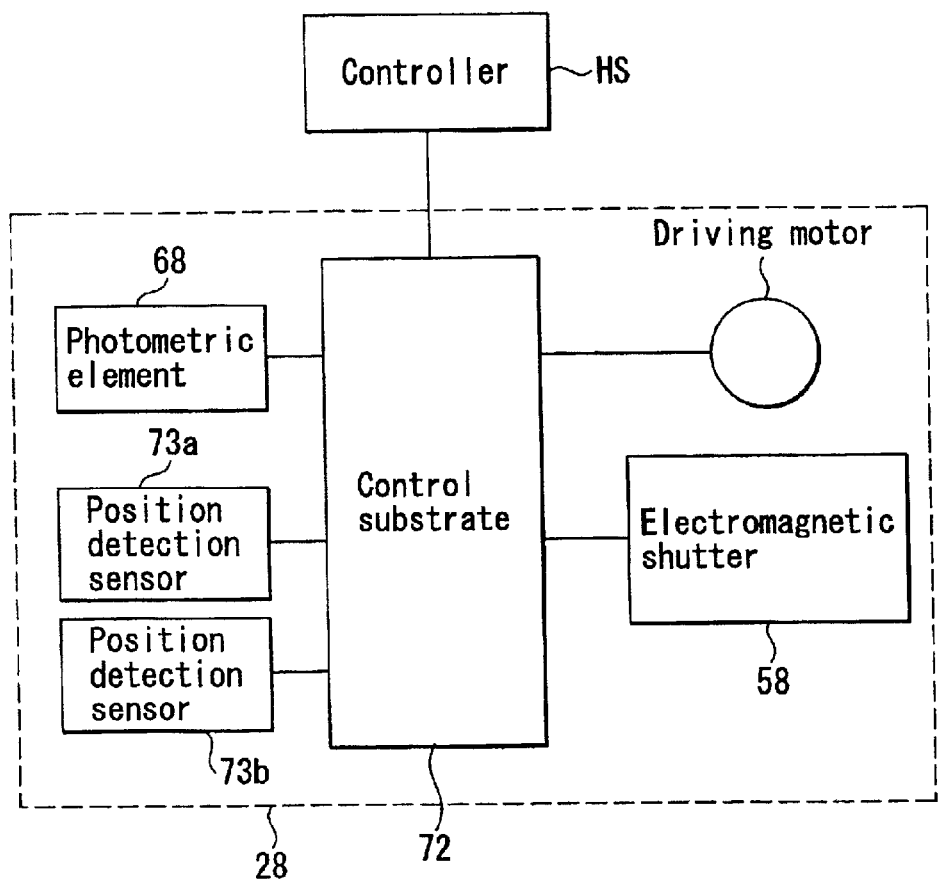
FIG. 23 is a block diagram showing a configuration of an electric system in one embodiment of a microscope photographing device according to the present invention.

FIG. 23 is a block view showing a schematic configuration of the electric system containing the position detection sensors 73a and 73b and the electromagnetic shutter 56. Either of the respective position detection sensors 73a and 73b is connected with the control substrate 72, and it is designed to be able to watch whether the optical path switching block 46 is located at the position at which the photographing by the large size film camera 20 can be carried out, or at the position at which the photographing by the 35 mm film camera 21 can be carried out, or at an intermediate position being neither of them.

The motor for driving M is a motor for driving the repulsive mirror part set 65, the motor for driving M and the measurement element 68 such as a photo-diode and the like are also connected with the control substrate 72, and the output from the measurement element 68 is usually monitored by the control substrate 72.

A controller HS is a controller by which the observer of the microscope carries out the input operation for photographing operation and various settings, and the signals input from the controller HS are transmitted to the control substrate 72 which is connected. The electromagnetic shutter 56 is connected with the control substrate 72 in order to control the opening and closing condition by display from the control substrate 72.

The motion of the photo photographing device related to the seventh embodiment constituted as above is illustrate.

The observer of the microscope operates the optical path switching operation lever 52 firstly, and selects whether the photographing by the large size film camera 20 is carried out, or the photographing by the 35 mm film camera 21 is carried out.

When the photographing by the large size film camera 20 is carried out, the optical path-switching operation lever 52 is pushed in and when the photographing by the 35 mm film camera 21 is carried out, the optical path-switching operation lever 52 is pulled out. Thus, a light path which can introduce the imaging flux required for photographing the photo of the observation sample 2 to the large size film camera 20 or the 35 mm film camera 21 is secured. When the photographing by the 35 mm film camera 21 or the 35 mm film camera 21 is in a possible condition by pushing in or pulling out the optical path switching operation lever 52, it is confirmed that the control substrate 72 is in a condition in which the photographing can be carried out according to the signals from the position detection sensors 73a and 73b, and it is in a waiting condition.

On the other hand, since the repulsive mirror part set 65 is in condition in which the mirror is always inserted in the light path at a usual time until the photographing motion is carried out, the portion of the imaging light flux enters into the light measurement element 68, the brightness of the image of the observation sample 2 is converted to electric signals, and the signals are transmitted to the control substrate 72.

The photographing conditions such as an optimum exposure time and the like are determined by inputting the output signals from the light measurement element 68 and the signals from the position detection sensors 73a and 73b.

A series of these motions are repeatedly carried out until the observer of the microscope pushes the photographing switch of the controller HS. When the brightness of the observation image is changed by changing the observation site operating the XY handle (not shown in the figure) of stage 3 of the observation sample 2, the photographing conditions such as an optimum exposure time and the like are changed in accordance with it.

When the site and the magnification photographed are determined and the observer of the microscope pushes the photographing switch of the controller HS, the photographing motion is started in accordance with the photographing conditions such as an optimum exposure time and the like determined just before the photographing switch is pushed. Firstly, an display is presented from the control substrate 72 to the driving motor M, and the mirror of the repulsive mirror part set 65 is retreated from the light path. When the mirror of the repulsive mirror part set 65 is retreated from the light path, an display for releasing the electromagnetic shutter 56 by the optimum exposure time determined is presented at the same time. The imaging flux passes during the electromagnetic shutter 56 is photographing.

When the optical path switching operation lever 52 is pushed in, the imaging flux passes the projection lens part set 47 for a large size film camera, is reflected by the first reflection mirror 24 for a large size film camera, and passes the opening 57a of the mechanical shutter base 57 which is not blocked by the mechanical shutter 58. Then, the light flux which passed the opening 57a is reflected by the second reflection mirror 26 for a large size film camera and the third reflection mirror 27 for a large size film camera, further passes the dust proof glass 63, and reaches at the large size film surface of the large size film camera 20. Thus, the photographing by the large size film camera 20 is completed under the determined photographing conditions such as an optimum exposure time and the like.

When the optical path switching operation lever 52 is pulled out, the imaging flux is reflected by the first reflection mirror 25 for a 35 mm film camera, passes the opening of the 35 mm film camera mount 64, and reaches at the 35 mm film surface of the 35 mm film camera 21. Thus, the photographing by the 35 mm film camera 21 is completed under the determined photographing conditions such as an optimum exposure time and the like.

Thus, according to the seventh embodiment, in the microscope photo photographing device which can mount the large size film camera 20 and the 35 mm film camera 21 at the same time, the light leak to one camera in a condition in which another camera 20 or 21 is not mounted can be surely prevented, and an error operation by the optical path switching operation can be prevented.

When the electromagnetic shutter 56 and the mechanical shutter 58 are in a closed condition, it is constituted that the first space completely closed by the large size film camera 20 and the mechanical shutter 58 and the second space completely closed by the electromagnetic shutter 56, the mechanical shutter 58 and the 35 mm film camera 21 are designed to be formed. Accordingly, the light path of the side which is not really used for the photographing among the large size film camera 20 or the 35 mm film camera 21 is blocked by the mechanical shutter 58 in link with the optical path switching block 46, the imaging flux is introduced only to another camera 20 or 21, and an unnecessary stray light to the one camera 20 or 21 desired to photograph can be cut. Thus, the unnecessary stray light is not generated in the inner part of the photographing device 28, and good photographing can be carried out.

Further, since the space which contains the large size film camera 20 and the space which contains the 35 mm film camera 21 are perfectly separated, even if either of the large size film camera 20 or the space which contains the 35 mm film camera 21 is removed, a structure in which the external light from the removed camera side does not reach at another camera can be realized, and the leak light to one camera caused by a sudden removal of another camera can be prevented.

Accordingly, when the large size film camera 20 or the 35 mm film camera 21 are removed by the observer of the microscope, the external light which invades in from the position of the large size film camera 20 or the position of the 35 mm film camera 21 does not reach to the direction of the large size film camera 20 or the 35 mm film camera 21 at all even if the optical path switching operation lever 52 is in any condition, therefore the 35 mm film or the large size film is not suddenly exposed to light, and it has an advantage that no mistake in photographing does not occur at all.

Further, when the optical path switching block 46 is located at an intermediate position other than the two positions, namely, the position at which the photographing by the large size film camera 20 can be carried out and the position at which the photographing by the 35 mm film camera 21 can be carried out, it is judged by the signals from the two position detection sensors 73a and 73b that the control substrate 72 is not in a condition in which it can be photographed, therefore the photographing operation is not carried out by mistake, and it has also an advantage that a mistake of generating a defect at the portion of the sight does not occur at all. Namely, it is possible to realize the prevention of generating a defect at the portion of the photographing sight.

The present invention is not limited to the above-mentioned embodiment. For example, in the above-mentioned embodiment, a case of mounting the large size film camera and the 35 mm film camera was illustrated, but it is a matter of course that a case of mounting a camera other than these cameras exhibits also the same effect. It can be carried out by variously changing additionally.

As described above, the inverted microscope related to the present invention is constituted as described below.

(1) The inverted microscope according to the present invention is characterized by comprising: an image output port that forms an image of an observation sample to the external surface facing to an observer, at the front side of a microscope main body, below an observation tube to which eyepieces are attached, wherein photographing devices configured that one of at least two kinds of photographing devices is selectively attachable/detachable to the image output port. Further, the inverted microscope according to the present invention is characterized in that the at least two kinds of photographing devices include: a photographing device that exposes and forms the image of the observation sample onto a film surface thereof; a TV camera that photographs the image of the observation sample by a photographing element thereof and outputs image data thereof; and a digital camera device that photographs the image of the observation sample and can record the image data as a still image into a recording medium.

The photo photographing devices such as a large size film camera and a 35 mm film camera and the preferable image recording devices such as a TV camera, a digital camera, and the like can be efficiently used in combination according to the requirement of the observer of a microscope.

(2) In (1), the inverted microscope according to the present invention is characterized in that the image formed on the image output port is an image that is reflected once by a reflection member in a light path from the observation sample to the image output port, and the image formed on the film surface of the photographing device is a front image that is reflected even-numbered times by a reflection member in the light path from the observation sample to the film surface, by providing the reflection member in the photographing device and generates odd-numbered times of reflections in the light path from the image output port to the film surface.

Since an image formed on the film surface of the large size film camera and the 35 mm film camera is made as a front image (an image having the same direction as the surface of a sample was observed as it was) while suppressing the light intensity loss and deterioration of image quality caused by the reflection of imaging flux in the main body of a microscope (scope body) to minimum, it is possible to faithfully record the magnified image of the tissue of a metal or the like.

(3) The inverted microscope according to the present invention is characterized comprising: an image forming optical system including objective lenses arranged below an observation sample placed on a stage of a microscope main body; an optical element which forms an image of the observation sample at the position where an image forming light flux obtained by the image forming optical system is polarized to an observer side from the optical axis of the objective lens; photographing means for photographing an image of the observation sample; an image recording section configured to record image signals photographed by the photographing means; and display means attached to the surface facing to the observer at the front of the microscope main body, for displaying images photographed by the photographing means.

A monitor observation with less fatigue is realized by providing a display device such as LCD or the like which displays an image photographed by an imaging element, in front of the main body of a microscope, and the image recording can be easily carried out. Further, since the observation optical system for observation by an eyepiece is not required, an inverted microscope which can carry out the observation by a monitor such as LCD or the like and the image recording can be realized by a simple configuration.

(4) In (3), the inverted microscope according to the present invention is characterized by further comprising: a light path splitting means for splitting the light path of an image of an observation sample formed by the image forming optical system; a relay optical system for guiding to an eyepiece the light flux from an observation sample of one light path split by the light path splitting means; and a photographing optical system set to a specified contraction magnification for guiding to the photographing means the light flux from an observation sample of the other light path split by the light path splitting means.

Both of the observation optical system for observation by an eyepiece and the imaging optical system with a low magnification suitable for the size of the imaging element can be realized by a simple configuration. Further, since a range which is nearly the same range as an display range by a monitor can be observed by the eyepiece together with the observation by the monitor such as LCD or the like, an inverted microscope being optimum to an observer who needs not only the observation by a monitor but also the observation by an eyepiece can be provided.

(5) In (3) or (4), the inverted microscope according to the present invention is characterized in that the display angle of the display means is variable.

Since the angle of the display face of a monitor such LCD or the like can be freely changed, an inverted microscope by which an observation posture with less fatigue can be taken in according with the physical status and liking of an observer can be provided.

(6) In (1) or (2), the inverted microscope according to the present invention is characterized in that the image of the observation sample is formed at the position protruded by a specified distance from the image output port, and when attaching one of the photographing device, the TV camera, and the digital camera device, a photographing lens unit corresponding to any of the photographing device to the image output port, the TV camera, and the digital camera device, among plural photographing lens units having different photographing magnifications, is assembled into the end surface portion of the image output port in an attachable/detachable manner.

Since an tube lens with an appropriate magnification can be easily combined in accordance with a image recording device and a photographing lens can be attached in the scope body in a separate body from a photo photographing device and a digital camera device, even a large scale photo photographing device and a digital camera device can be attached in the scope body in a high rigidity and good stability, and as a result, a good image recording without image deviation can be realized.

(7) In (6), the inverted microscope according to the present invention is characterized by further comprising plural photographing lens units having different photographing magnifications respectively in accordance with the photographing device, the digital camera device, and the TV camera, and one of the plural photographing lens units is assembled therein according to the kind of the photographing device, the TV camera, and the digital camera device.

A image recording with various imaging magnification can be carried out corresponding to the wide requirement of an observer irrespective of the kind of a photo photographing device and image recording devices such as a digital camera device, a TV camera and the like.

(8) In (6) or (7), the inverted microscope according to the present invention is characterized in that the contraction magnification of the photographing system is so set that the magnification of the image of the observation sample displayed by the display means should be equal to the magnification of the image of the observation sample observed by the eyepieces.

An observer can always carry out an observation in which an observation magnification at an eyepiece is equal to the magnification of an image displayed by a display procedure, and can carry out an observation work without any trouble.

(9) In (6) or (7), the inverted microscope according to the present invention is characterized in that when displaying the image photographed by the photographing means by the display means, a signal processing portion having an electronic zoom function for magnifying the image by an optional magnification is arranged, and the contraction magnification of the photographing optical system ($\beta$) is made so that the area of the image photographed by the photographing means should be almost equal to the area observed by the eyepieces ($\beta \approx K/FN$, when the width across of the photographing element is set as K, and the number of views of the eyepieces is set as FN), and the magnification of the electronic zoom is made variable, thereby the magnification of the image of the observation sample displayed by the display means can be made equal to the magnification of the image of the observation sample observed by the eyepieces.

While realizing the taking-in of maximum range in which the range of an image imaged by the fore-mentioned imaging procedure is nearly the same observation range as that of the fore-mentioned eyepiece, the observation at the same magnification as the eyepiece can be also carried out by displaying in magnification on a display procedure utilizing an electronic zoom, according to the liking of an observer.

(10) In (6) or (7), the inverted microscope according to the present invention is characterized by further comprising: means for storing plural magnifications of the image of the observation sample displayed by the display means changed by the electronic zoom function; and means for setting the magnification of the image of the observation sample displayed by the display means to an optional magnification.

An observation at an electronic zoom magnification stored using a display procedure can be easily carried out.

Further, according to the above-mentioned respective inverted microscope, it comes to be possible to copy microscale and the like and to record the image whose magnification was changed by zoom in all of the fore-mentioned image recording device, and it is very preferable in working.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. An inverted microscope comprising:

an image output port that forms an image of an observation sample to an external surface of a microscope main body, an observer side and a front side the microscope main body, and below a lens tube to which eyepieces are attached, wherein:

at least one of a photograph device, a TV camera and a digital camera device is selectively coupled/decoupled to the image output port;

the photographic device exposes and forms the image of the observation sample onto a film surface thereof;

the TV camera photographs the image of the observation sample by a photographing elements thereof and outputs image data thereof;

the digital camera device photographs the image of the observation sample and records the image data as a still image on a recording medium; and at least a first camera and a second camera are attachable to the microscope main body, the photographing device comprising:
 a light path switching mechanism that guides an image formation light flux from the microscope main body to at least one of the first camera and the second camera;
 a photographing shutter arranging in a light path of the image formation light flux in a light incoming side of the light path switching mechanism; and
 shutter mechanism arranged in the light path toward the first camera side split by the light path switching mechanism, and blocking the light flux on the light path in synchronization with the switching actions of the light path switching mechanism, wherein the shutter mechanism comprises:
  a light path switching lever which pulls and inserts a throttle plate, which has an opening for passing the image formation light flux toward the first camera, and moves to a position to pass the image formation light flux or to a position to block the image formation light flux, in synchronization with the pulling and inserting operation of the light path switching lever;
  an openable and closable mechanical shutter main body having a size sufficient to block the image formation light flux through the opening, and
  a link mechanism which moves the mechanical shutter main body to the position to close the opening before the throttle plate blocks the image formation light flux in synchronization with the movement of the throttle plate.

2. The inverted microscope according to claim 1, wherein, in a state where the photographing shutter and the shutter mechanism are closed, a first space and a secure space are formed, the first space includes part of the light path of the image formation light flux toward the first camera and is closed completely by the first camera and the shutter mechanism, and the second space includes the light path of the image formation light flux toward the light path switching mechanism and the shutter mechanisms and is closed completely by the photographing shutter, the shutter mechanisms and the second camera.

3. The inverted microscope according to claim 1, wherein said light path switching mechanism comprises:

position detecting sensors that detect which of the first camera or the second camera the image formation light flux from the microscope main body is guided; and means for enabling an operation of the photographing shutter only when the position detecting sensors detect that the image formation light flux from the microscopic main body is guided to either the first camera or the second camera.

* * * * *